United States Patent
Plut

(10) Patent No.: US 9,135,884 B2
(45) Date of Patent: Sep. 15, 2015

(54) LCD PLATEAU POWER CONSERVATION

(75) Inventor: William J. Plut, Los Altos, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1146 days.

(21) Appl. No.: 12/705,929

(22) Filed: Feb. 15, 2010

(65) Prior Publication Data

US 2010/0141635 A1    Jun. 10, 2010

Related U.S. Application Data

(63) Continuation of application No. 11/122,313, filed on May 4, 2005, now Pat. No. 7,663,597, which is a continuation-in-part of application No. 10/891,734, filed on Jul. 15, 2004, now Pat. No. 7,580,033.

(60) Provisional application No. 60/487,761, filed on Jul. 16, 2003.

(51) Int. Cl.
*G09G 3/36* (2006.01)
*G09G 5/00* (2006.01)
(Continued)

(52) U.S. Cl.
CPC ............ *G09G 5/00* (2013.01); *G06F 1/3218* (2013.01); *G06F 1/3265* (2013.01); *G09G 3/3208* (2013.01); *G09G 3/3406* (2013.01); *G09G 3/3611* (2013.01); *G09G 2310/04* (2013.01); *G09G 2320/0626* (2013.01); *G09G 2320/0646* (2013.01); *G09G 2320/0686* (2013.01); *G09G 2330/022* (2013.01); *G09G 2360/16* (2013.01); *Y02B 60/1242* (2013.01)

(58) Field of Classification Search
CPC ......... G06F 3/038; G06F 1/3218; G09G 3/36; G09G 5/00; G09G 3/3208; G09G 3/3406; G09G 3/3611; G09G 2320/0626; G09G 2320/0646; G09G 2320/0686; G09G 2330/022; G09G 2360/16; G09G 2310/04; G09G 2330/021; G09G 2330/02; G09G 3/3696; G09G 3/3648; G09G 3/3688; Y02B 60/1242
USPC .................................................. 345/102, 690
See application file for complete search history.

(56) References Cited

U.S. PATENT DOCUMENTS

| | | |
|---|---|---|
| 3,795,765 A | 3/1974 | DeGroat |
| 4,817,179 A | 3/1989 | Buck |

(Continued)

OTHER PUBLICATIONS

"Energy-adaptive Display Designs for Future Mobile Environments" Iyer et al. Proceeding of ModiSys 2003: The First International Conference on Mobile Systems, Applications, and Services, San Francisco, CA, May 2003.

*Primary Examiner* — Towfiq Elahi
(74) *Attorney, Agent, or Firm* — Jefferson IP Law, LLP

(57) ABSTRACT

Described herein are power conservation systems and methods that reduce power consumption for an electronics device including a liquid crystal display (LCD). The LCD includes a backlight that offers multiple luminance levels, where each level consumes a different amount of power. The systems and methods alter video information while the backlight remains at a backlight luminance level. The alteration reduces luminance for the video information to produce new video information that can be presented at a lower backlight luminance level. Change to the lower backlight luminance level may then occur without significantly affecting aggregate luminance of the new video information, as perceived by a user. The LCD and electronics device consume less power at the lower luminance level.

18 Claims, 11 Drawing Sheets

(51) Int. Cl.
  *G06F 1/32* (2006.01)
  *G09G 3/32* (2006.01)
  *G09G 3/34* (2006.01)

(56) References Cited

U.S. PATENT DOCUMENTS

| | | | |
|---|---|---|---|
| 4,952,917 A | 8/1990 | Yabuuchi | |
| 5,029,004 A | 7/1991 | Shibayama | |
| 5,270,818 A | 12/1993 | Ottenstein | |
| 5,359,345 A | 10/1994 | Hunter | |
| 5,488,434 A | 1/1996 | Jung | |
| 5,524,249 A | 6/1996 | Suboh | |
| 5,572,655 A | 11/1996 | Tuljapurkar | |
| 5,592,194 A | 1/1997 | Nishikawa | |
| 5,598,565 A | 1/1997 | Reinhardt | |
| 5,615,376 A | 3/1997 | Ranganathan | |
| 5,619,707 A | 4/1997 | Suboh | |
| 5,625,826 A | 4/1997 | Atkinson | |
| 5,642,125 A | 6/1997 | Silverstein et al. | |
| 5,675,364 A | 10/1997 | Stedman | |
| 5,719,958 A | 2/1998 | Wober | |
| 5,745,375 A | 4/1998 | Reinhardt | |
| 5,781,768 A | 7/1998 | Jones, Jr. | |
| 5,796,382 A | 8/1998 | Beetson | |
| 5,796,391 A | 8/1998 | Chiu | |
| 5,808,693 A | 9/1998 | Yamashita | |
| 5,822,599 A | 10/1998 | Kidder et al. | |
| 5,880,728 A | 3/1999 | Yamaashi et al. | |
| 5,881,299 A | 3/1999 | Nomura et al. | |
| 5,914,751 A | 6/1999 | Korth | |
| 5,943,032 A | 8/1999 | Nagaoka | |
| 5,956,014 A | 9/1999 | Kuriyama | |
| 5,961,617 A | 10/1999 | Tsang | |
| 5,991,883 A | 11/1999 | Atkinson | |
| 6,026,179 A | 2/2000 | Brett | |
| 6,029,249 A | 2/2000 | Atkinson | |
| 6,031,914 A | 2/2000 | Tewfik | |
| 6,043,853 A | 3/2000 | Shimazaki | |
| 6,069,440 A | 5/2000 | Shimizu | |
| 6,076,169 A | 6/2000 | Lee | |
| 6,100,859 A | 8/2000 | Kuriyama | |
| 6,104,362 A | 8/2000 | Kuriyama | |
| 6,111,559 A | 8/2000 | Motomura | |
| 6,133,895 A * | 10/2000 | Huang | 345/94 |
| 6,144,440 A | 11/2000 | Osgood | |
| 6,177,933 B1 | 1/2001 | Young | |
| 6,177,946 B1 | 1/2001 | Sinclair | |
| 6,219,021 B1 * | 4/2001 | Izumi | 345/102 |
| 6,232,937 B1 | 5/2001 | Jacobsen | |
| 6,278,887 B1 | 8/2001 | Son | |
| 6,297,601 B1 | 10/2001 | Kang | |
| 6,323,880 B1 | 11/2001 | Yamada | |
| 6,345,364 B1 | 2/2002 | Lee | |
| 6,356,284 B1 | 3/2002 | Manduley | |
| 6,362,835 B1 | 3/2002 | Urbanus | |
| 6,366,291 B1 | 4/2002 | Taniguchi | |
| 6,396,508 B1 | 5/2002 | Noecker | |
| 6,396,520 B1 | 5/2002 | Ording | |
| 6,404,423 B1 * | 6/2002 | Kivela et al. | 345/212 |
| 6,408,293 B1 | 6/2002 | Aggarwal | |
| 6,411,306 B1 | 6/2002 | Miller | |
| 6,411,953 B1 | 6/2002 | Ganapathy | |
| 6,414,675 B1 | 7/2002 | Shen | |
| 6,452,610 B1 | 9/2002 | Reinhardt | |
| 6,453,076 B1 | 9/2002 | Nakajima | |
| 6,473,078 B1 | 10/2002 | Ikonen | |
| 6,473,532 B1 | 10/2002 | Sheraizin | |
| 6,496,165 B1 | 12/2002 | Ide | |
| 6,529,212 B2 | 3/2003 | Miller | |
| 6,552,736 B2 | 4/2003 | Honda | |
| 6,587,087 B1 | 7/2003 | Ishizuka | |
| 6,606,103 B1 | 8/2003 | Hamlet | |
| 6,611,608 B1 | 8/2003 | Wu | |
| 6,621,489 B2 | 9/2003 | Yanagisawa | |
| 6,628,067 B2 | 9/2003 | Kobayashi | |
| 6,657,634 B1 | 12/2003 | Sinclair | |
| 6,661,029 B1 | 12/2003 | Duggal | |
| 6,661,428 B1 | 12/2003 | Kim | |
| 6,667,727 B2 | 12/2003 | Iwaoka | |
| 6,677,924 B2 | 1/2004 | Nakayama | |
| 6,677,936 B2 | 1/2004 | Jacobsen | |
| 6,683,605 B1 | 1/2004 | Bi et al. | |
| 6,691,236 B1 | 2/2004 | Atkinson | |
| 6,693,385 B2 | 2/2004 | Koyama | |
| 6,701,263 B2 | 3/2004 | Jeong | |
| 6,711,212 B1 | 3/2004 | Lin | |
| 6,724,149 B2 | 4/2004 | Komiya | |
| 6,724,151 B2 | 4/2004 | Yoo | |
| 6,731,815 B1 | 5/2004 | Hu | |
| 6,744,818 B2 | 6/2004 | Sheraizin | |
| 6,762,741 B2 | 7/2004 | Weindorf | |
| 6,768,520 B1 | 7/2004 | Rilly | |
| 6,774,878 B2 | 8/2004 | Yoshida | |
| 6,788,003 B2 | 9/2004 | Inukai | |
| 6,788,822 B1 | 9/2004 | Zhang | |
| 6,791,566 B1 | 9/2004 | Kuratomi | |
| 6,801,811 B2 | 10/2004 | Ranganathan et al. | |
| 6,809,706 B2 | 10/2004 | Shimoda | |
| 6,812,650 B2 | 11/2004 | Yasuda | |
| 6,816,135 B2 | 11/2004 | Ide | |
| 6,819,036 B2 | 11/2004 | Cok | |
| 6,822,631 B1 | 11/2004 | Yatabe | |
| 6,829,005 B2 | 12/2004 | Ferguson | |
| 6,839,048 B2 | 1/2005 | Park | |
| 6,850,214 B2 | 2/2005 | Nishitani et al. | |
| 6,900,798 B2 | 5/2005 | Heie | |
| 6,912,664 B2 | 6/2005 | Ranganathan et al. | |
| 6,938,176 B1 | 8/2005 | Alben | |
| 7,012,588 B2 | 3/2006 | Siwinski | |
| 7,114,086 B2 | 9/2006 | Mizyuabu et al. | |
| 7,301,522 B2 | 11/2007 | Ko | |
| 7,312,771 B2 | 12/2007 | Iwamura | |
| 7,389,432 B2 | 6/2008 | Chandley et al. | |
| 7,400,314 B1 | 7/2008 | Agano | |
| 7,432,897 B2 | 10/2008 | Nishitani et al. | |
| 7,437,438 B2 | 10/2008 | Mogul et al. | |
| 7,460,103 B2 | 12/2008 | Konno et al. | |
| 7,463,235 B2 | 12/2008 | Hiyama et al. | |
| 7,505,034 B2 | 3/2009 | Nguyen | |
| 7,580,031 B2 | 8/2009 | Plut | |
| 7,580,033 B2 | 8/2009 | Plut | |
| 7,583,260 B2 | 9/2009 | Plut | |
| 7,602,388 B2 | 10/2009 | Plut | |
| 7,602,408 B2 | 10/2009 | Plut | |
| 7,629,971 B2 | 12/2009 | Plut | |
| 7,663,597 B2 | 2/2010 | Plut | |
| 7,714,831 B2 | 5/2010 | Plut | |
| 7,760,210 B2 | 7/2010 | Plut | |
| 7,786,988 B2 | 8/2010 | Plut | |
| 2001/0032321 A1 | 10/2001 | Nanno et al. | |
| 2002/0008694 A1 * | 1/2002 | Miyachi et al. | 345/204 |
| 2002/0030660 A1 * | 3/2002 | Arakawa | 345/102 |
| 2002/0063671 A1 | 5/2002 | Knapp | |
| 2003/0071805 A1 | 4/2003 | Stanley | |
| 2004/0113906 A1 * | 6/2004 | Lew et al. | 345/211 |
| 2006/0020906 A1 | 1/2006 | Plut | |
| 2006/0071899 A1 | 4/2006 | Chang | |
| 2006/0125745 A1 | 6/2006 | Evanicky | |

\* cited by examiner

LCD PLATEAU POWER CONSERVATION

CROSS-REFERENCE TO RELATED APPLICATIONS

This application is a continuation of and claims priority under U.S.C. §120 from co-pending U.S. patent application Ser. No. 11/122,313, filed May 4, 2005 and entitled, "LCD PLATEAU POWER CONSERVATION"; application Ser. No. 11/122,313 is a continuation-in-part and claims priority under 35 U.S.C. §120 from commonly-owned and co-pending U.S. patent application Ser. No. 10/891,734, filed Jul. 15, 2004 and titled "SPATIAL-BASED POWER SAVINGS", which claimed priority under 35 U.S.C. §119(e) from U.S. Provisional Patent Application No. 60/487,761 filed on Jul. 16, 2003; each of these applications is incorporated herein by reference for all purposes.

FIELD OF THE INVENTION

This invention relates to systems and methods that reduce power consumed by an electronics device that includes an LCD display. More particularly, the present invention relates to techniques for conserving power by altering video data such that lower backlight power levels of an LCD display may be used.

BACKGROUND

Video output consumes a significant amount of power for a laptop or desktop computer. Other computing systems and electronics devices—such as handheld computing devices, cellular telephones and MP3 players—also devote a large fraction of their power budget to video. Power consumption sensitivity increases for portable devices that rely on a battery having limited energy supply.

Liquid crystal displays (LCD) are a widely adopted type of display device that includes a backlight and pixelated filters. The backlight typically emits white light that is filtered by red, green and blue (RGB) filtering elements for each pixel.

Current power conservation techniques alter an entire LCD image at once. These techniques uniformly shut down the backlight or assume a much lower backlight luminance level. This noticeably changes the video output, and often the backlight reduction is so drastic that it compromises a person's ability to see any graphics. The change is also markedly sudden, which coupled with the harsh change in luminance, draws the person's attention to the diminished graphics—and their inability to see them. Frequently, a person responds by reactivating the entire display, thereby returning the LCD to full power. As a result, minimal power is saved.

Based on the foregoing, it should be apparent that alternative power conservation techniques would be desirable.

SUMMARY

The present invention provides power conservation systems and methods that reduce power consumption for an electronics device including a liquid crystal display (LCD). The LCD includes a backlight that offers multiple luminance levels, where each level consumes a different amount of power. The systems and methods alter video information while the backlight remains at a luminance level. The alteration reduces luminance for the video information to produce new video information that can be presented at a lower backlight luminance level. In some cases, change to the lower backlight luminance level occurs without significantly affecting aggregate luminance of the new video information as perceived by a user.

In one embodiment, the alteration includes reducing luminance and transmissivity of the video information using pixilated filters included in the LCD, while maintaining the backlight at a current luminance level. To reduce visual impact of the changes, luminance and transmissivity alteration may occur multiple times and progressively without substantial perceptual changes for any single alteration. In this case, luminance levels for the video information gradually reduce until the video information can be presented at the lower backlight luminance level. The backlight then changes to the lower luminance level—and starts consuming less power. Also, at this time, the video information may be returned to increased transmissivity so that the aggregate (or net) luminance for the video information as perceived by a user does not substantially adjust when the backlight luminance level drops. This may prevent the person from detecting the backlight change. Power conservation then includes the difference in power consumption between the first and second luminance levels, and continues for as long as the backlight remains in the lower luminance level.

Video alteration may continue in this manner to additional lower luminance levels for the backlight. For example, additional alteration may continue until the video information reaches a third luminance level. The backlight then changes to the third and even lower luminance level (and the video data transmissivity may again change to reduce or avoid perception of the second backlight change), thereby consuming even less power. Video alteration may continue until the backlight reaches its lowest level, until some predetermined cutoff, until the backlight turns off, or until user activity re-activates the LCD display.

In one aspect, the present invention relates to a method for reducing power consumed by an electronics device that includes a liquid crystal display device. The method comprises altering video information for output on the liquid crystal display device to produce altered video information. This occurs while a backlight included in the liquid crystal display device provides light at a first backlight luminance level. The altered video information includes a high luminance limit that is less than or about equal to a second backlight luminance level offered by the backlight. The method also comprises changing the backlight to the second backlight luminance level.

In another aspect, the present invention relates to a method for reducing power consumed by an electronics device. The method comprises reducing transmissivity of video information for output on a liquid crystal display device to produce altered video information. The altered video information includes a new maximum luminance that is less than or about equal to a second backlight luminance level. The method also comprises changing the backlight to the second backlight luminance level, which consumes less power than the first backlight luminance level. The method further comprises increasing transmissivity of altered video information.

In a temporal conservation aspect, the method alters video information after a predetermined threshold time.

In yet another aspect, the present invention relates to a computer readable medium including instructions for reducing power consumed by an electronics device that includes a liquid crystal display device. The computer readable medium includes instructions for altering video information and instructions for changing a backlight to a second backlight luminance level.

In still another aspect, the present invention relates to a system for reducing power consumed by an electronics device. The system includes a monitoring apparatus designed or configured to monitor user activity in a display area for a liquid crystal display device. The system also includes a power conservation apparatus designed or configured to a) receive user activity information provided by the monitoring apparatus, b) alter video information for output on the liquid crystal display device to produce altered video information, and c) output a signal used to change the backlight to the second backlight luminance level. The altered video information includes a high luminance limit that is less than or about equal to a second backlight luminance level offered by the backlight.

In another aspect, the present invention relates to an electronics device that includes a liquid crystal display and a power conservation apparatus. The liquid crystal display device includes a backlight offering multiple backlight luminance levels, wherein the liquid crystal display device changes power consumption with each backlight luminance level.

These and other features of the present invention will be presented in more detail in the following detailed description of the invention and the associated figures.

DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 1:
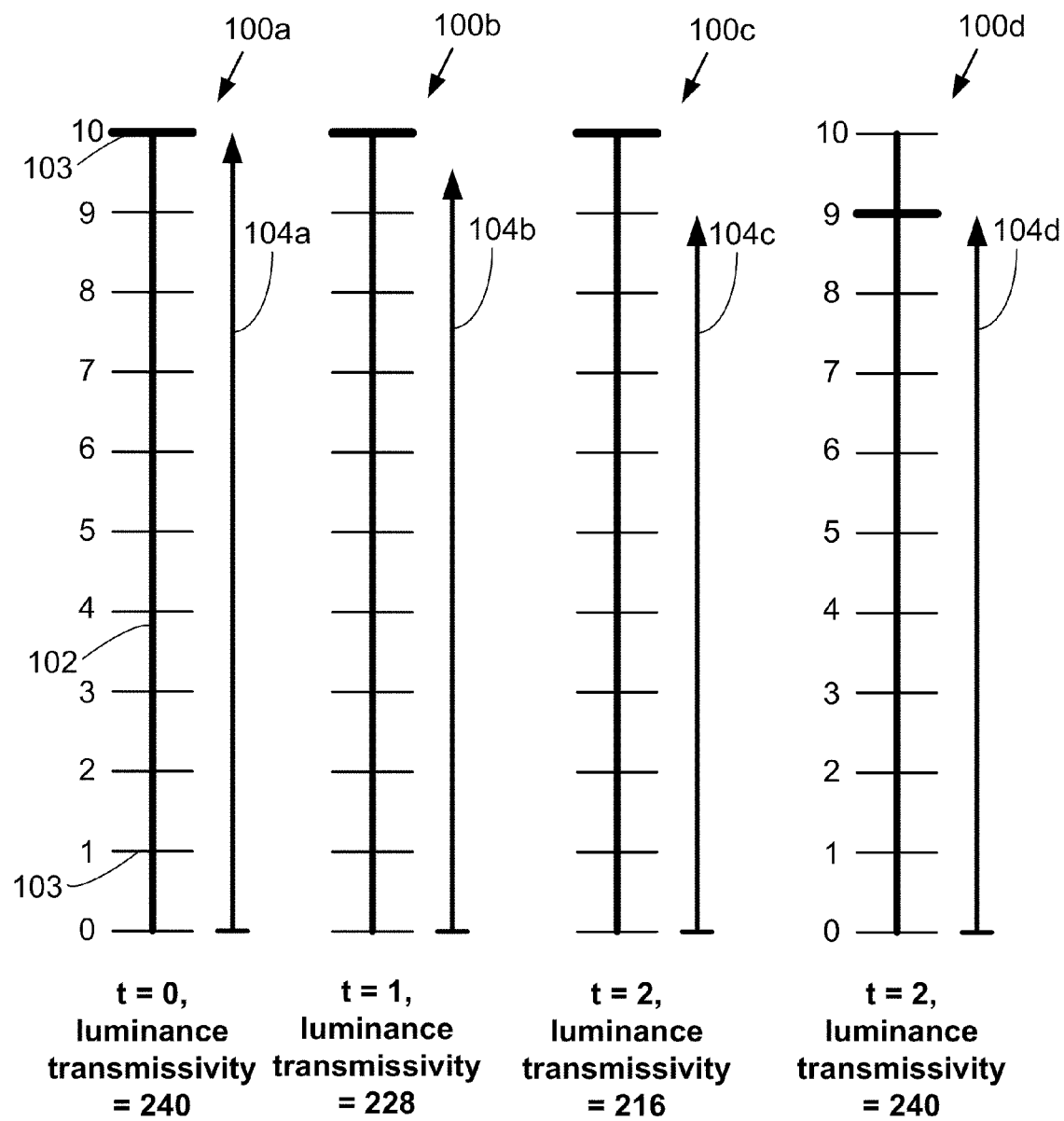
FIG. 1 shows video information alteration for an exemplary pixel in accordance with one embodiment of the present invention.

LCD devices provide two degrees of freedom for controlling luminance: 1) different luminance levels provided a backlight and 2) graduated filtering by optical modulation elements for each pixel. FIG. 1 shows video information alteration for an exemplary pixel in accordance with a specific embodiment of the present invention. Four luminance states $100a$-$d$ are shown at three different times: t=0, t=1 and t=2.

Scale 102 illustrates a number of backlight luminance levels 103 offered by a backlight used in an LCD device. As shown, the LCD provides ten discrete backlight levels 103, numbered from 0 to 10, where 0 is off and 10 represents the maximum luminance for the backlight. In this simplified example, each increasing integer luminance level between 0 and 10 provides a proportionate increasing luminance (each level represents about 10% the maximum luminance) for the backlight. More complicated backlight levels are suitable for use, and will be described in further detail below.

Transmissivity refers to the amount of light passage provided by optical modulation elements for a pixel in an LCD device. Many LCD devices include red green and blue (RGB) filters that act as optical modulation elements, where each filter regulates passage of white light produced by the backlight through a colored filter element to produce red, green and blue light, respectively. Transmissivity may then be expressed using RGB values sent on control signals to each RGB filter. LCD devices including modulation elements that respond to RGB transmissivity values ranging from 0 to 255 are common. The video information and transmissivity may also be expressed and converted to and from another video data scheme. An HSL color scheme characterizes video output according to a wavelength or color (hue), degree of purity of the color—or degree of separation from gray having the same color (saturation), and degree of brightness for the color ranging from black to white (luminance). Transmissivity may also then be expressed in HSL luminance. For example, luminance may be provided at integers between 0 and 240, where zero represents black (full filtering and blocking of light provided by the backlight) and 240 represents white (no filtering and blocking of light provided by the backlight).

As the term is used herein, 'aggregate luminance' refers to a net or total luminance output by the LCD device, or the luminance output by an LCD as perceived by a viewer. This aggregate luminance combines the effects of luminance provided by a) the backlight and b) filtering provided by the optical modulation elements for each pixel. The aggregate luminance is typically limited to a maximum determined by the backlight level since the pixelated filters only reduce light currently offered by the backlight. For FIG. 1, maximum luminance for the LCD device corresponds to a backlight level of 10 and luminance transmissivity of 240. At backlight luminance level 9, the maximum aggregate luminance for video data corresponds to a luminance transmissivity of 240 (t=2, 104*d*). Aggregate luminance for the pixel is designated as 104*a-d* for FIG. 1 at each time instance.

Both the backlight level and the luminance transmissivity are controllable. The present invention leverages these two degrees of freedom to reduce power for the LCD device.

At time t=0, this high luminance pixel (a white pixel) includes a backlight level of 10 and luminance transmissivity of 240, which corresponds to a maximum for the aggregate luminance and is designated as 104*a*.

The present invention first alters video information for the pixel and reduces transmissivity and luminance for the pixel. At time t=1, the backlight level remains at level 10 but the video information is altered to reduce the luminance transmissivity to 228. This provides an aggregate luminance of 104*b* (a less white shade). At time t=2, the backlight level still remains at level 10 but the video information is further altered to reduce the luminance transmissivity to 224 (an even less white shade). This provides an aggregate luminance of 104*c* (an even less white shade).

Aggregate luminance of 104*c* is noteworthy because it approximately corresponds to the aggregate luminance of 104*d* provided by the LCD device for the pixel when the backlight level drops to level 9 and the luminance transmissivity returns to 240 (a higher level that approximately matches the current luminance or its original transmissivity level). At this time, t=2, the backlight level drops from level 10 to level 9 and the luminance transmissivity increases from 224 to 240—without changing the aggregate luminance 104 output by the LCD and as perceived by a viewer. Power consumption for the backlight and LCD device reduces when the backlight level changes from level 10 to level 9.

Although the above example has been simplified to illustrate two degree of freedom luminance control, the present invention is not limited to such simple expressions of backlit luminance levels and pixel transmissivity. The above example employed ten backlight luminance levels; other numbers of backlight luminance levels are contemplated. In general, the LCD device may include any number of backlight luminance levels. The backlight luminance levels also need not correspond to simple fractions of the maximum luminance or integer levels as described above. At the least, the LCD device offers two backlight levels. In addition, luminance transmissivity is not limited to expression using a range of 1-240. Other luminance transmissivity and color schemes are described in further detail below. As one of skill in the art will appreciate, the number and characterization of backlight luminance levels will depend on the LCD used, while the number and characterization of video information will depend on the video scheme used to represent the video data.

Aggregate luminance thus allows a designer to relate backlight luminance levels and pixel transmissivity. This permits a designer to alter the video information using pixel transmissivity and relate the modifications to backlight luminance. The aggregate luminance thus permits mathematically modeling of luminance output by the LCD and perceived by a user—as determined by the combination of backlight and pixilated transmissivity. For example, the aggregate luminance may provide a ratio (or another suitable mathematical relationship) between the backlit luminance levels and pixel transmissivity, which is then used to determine alterations to the video information to achieve the next backlight luminance level. In the above-simplified embodiment for example, pixel transmissivities are reduced according to the ratio of the next backlight luminance level to the current one (9/10 their original value in the illustrative example). Thus, all pixels may be reduced to 9/10 their original value before changing the backlight and simultaneously increasing the pixel transmissivities to reduce visual impact of the backlight reduction. In another embodiment, one or more histogram manipulation techniques may be used to alter the video data instead of the aggregate luminance, as will be described below.

Figure 3A:
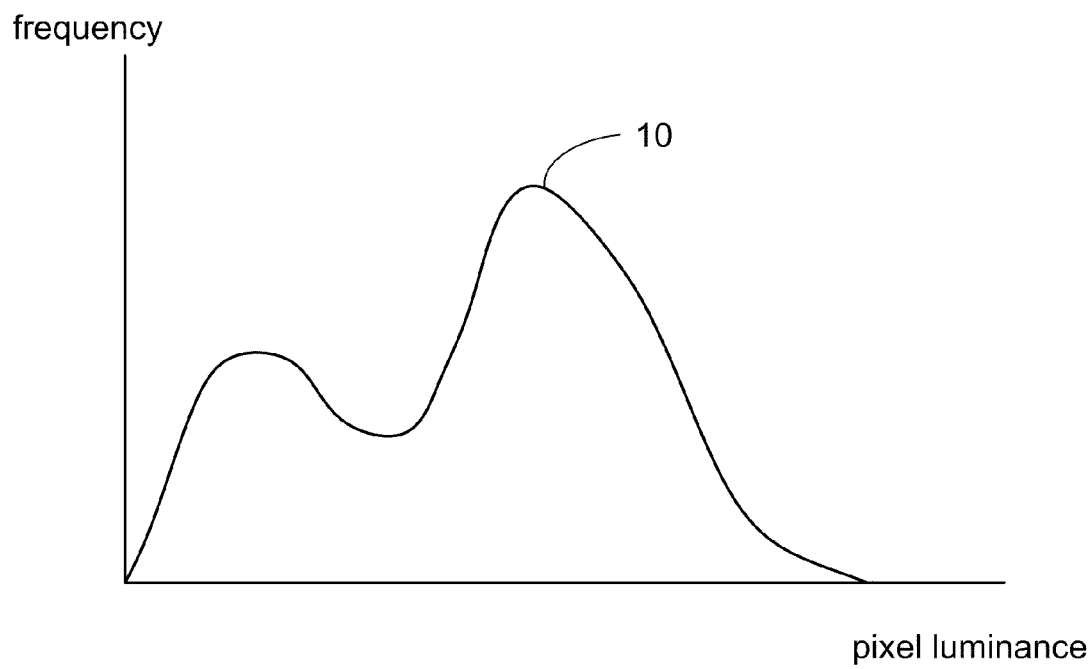
FIG. 3A illustrates an exemplary histogram.

Although the present invention has so far referred to alteration of luminance for a single pixel, it is understood that an image will include an array of pixels and luminance values. A histogram describes the frequency of pixel values (e.g., luminance or chroma) for an image. FIG. 3A illustrates an exemplary histogram 20.

One embodiment of the invention sets a high luminance limit for the histogram. The high luminance limit refers to a reference luminance level for the video information that may be used to guide alteration before changing the backlight luminance. Typically, the high luminance limit is near an upper limit of the luminance values in the image histogram. In a specific embodiment, the high luminance limit is the maximum luminance for the video information, and the maximum is altered to produce a new maximum luminance for the altered video information that is less than the largest available luminance at the next backlight level. This allows aggregate luminance for any pixel in the image to remain relatively constant (or produce little perceptible change) at the moment of backlight level change. As time proceeds, the maximum luminance for the video information can be progressively altered in one or more steps until each new maximum luminance is less than or about equal to a next backlight luminance level. In another embodiment, the high luminance limit includes a luminance less than the maximum. In this case, the high luminance does not have to be the maximum luminance. One such non-maximum option sets the high luminance limit as an average of the top 5 percent of luminance values in the histogram 20. Larger percentage ranges that produce other representative limits may be used. Other high luminance limits may also be used.

The example of FIG. 1 also shows two alterations before the video information is ready for backlight luminance reduction. The present invention may, however, include any number of alterations to the video information before reaching altered video information ready for a new backlight luminance level. For example, from 1 to about 100 alterations is suitable in many embodiments. In a specific embodiment, from about 10 to about 30 alterations are suitable. Alteration intervals may be used to describe the number of alterations and time between each. For example, one progressive relationship provides an alteration of x/Ltot every t seconds, where x is the initial luminance of the video information of a pixel before any alterations begin (e.g., 240 for white), Ltot is the maximum transmissivity for the video information (240 for FIG. 1), and t is the alteration interval in seconds. The backlight then reduces in luminance at power reduction intervals (PRI) of PRI=t*Ltot/N, where N is the number luminance levels for the backlight. In the example of FIG. 1, luminance transmissivity for any pixel decreases by x/240 every 2 seconds to produce a PRI and backlight luminance change every 48 seconds (=2*240/10). In a specific embodiment, the alteration intervals are approximately constant.

Non-constant intervals may also be employed. In general, video information alteration may include any luminance verse time relationship that produces reduced transmissivity luminance levels and permits backlight level reductions.

Figure 2A:
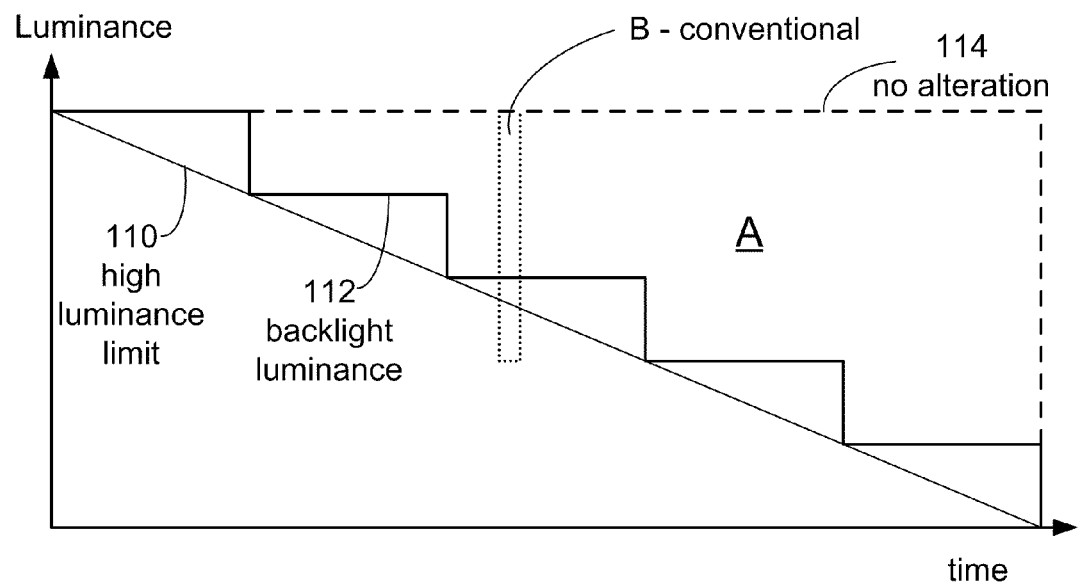
FIG. 2A illustrates an exemplary luminance progression of video information in accordance with a specific embodiment of the present invention.

FIG. 2A illustrates an exemplary luminance progression 110 of video information in accordance with a specific embodiment of the present invention.

Video alteration progression 110 includes a linear reduction in luminance as time progresses. In this case, progression 110 refers to the maximum luminance in the histogram as the high luminance limit of video information being displayed. Lesser luminance values will be included for other pixels in the histogram, and modified according to power conservation system design. One linear relationship was provided above. Several histogram manipulation techniques that describe how all pixels in an image are altered will be described below.

As the video information reduces in luminance, backlight luminance 112 progressively drops as the high luminance limit for the video information reduces to the next backlight luminance level.

Dashed line 114 portrays power consumption of the LCD device with no power conservation. Area 'A' designates area under the curve and the difference between dashed line 114 and power consumption using backlight luminance 112 as it progressively drops. Area A then represents power conserved by the present invention In contrast, area 'B' illustrates an exemplary conventional power conservation system that instantaneously plunges the backlight luminance level down to a fourth (fourth from the topmost level). This alteration noticeably changes the video screen, is markedly sudden (it is usually well above the minimum threshold of detection), and draws the person's attention to the diminished graphics and their inability to see them. The minimal time at reduced power then corresponds to the reaction time of the person to reactivate the entire display and return the LCD to full power. Area B conserves significantly less power than Area A. In this example, the present invention provides a gradual curve of small incremental changes in which no individual change is perceptible.

It is understood that power conserved over time will vary with the display device, system design, and behavior of a user. However, the present invention reduces power consumption over time by gradually reducing power. In some cases, alteration may begin immediately. In another embodiment, the alteration commences after a threshold inactivity time, as will be described below.

Figure 4A:
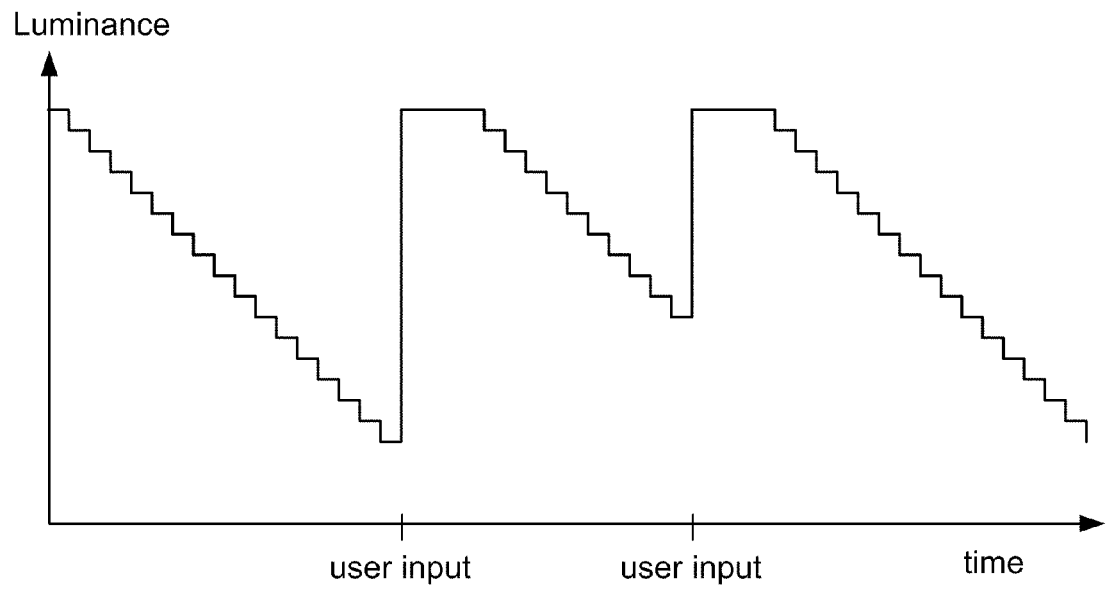
FIG. 4A illustrates stepwise power conservation according to the present invention over an extended period of time that includes intermittent user activity that re-activates the LCD to full power.

The present invention may also employ conventional power savings techniques in addition to transmissivity and backlight changes described herein. One conventional technique re-activates the LCD to full power in response to user input. FIG. 4A illustrates stepwise power conservation according to the present invention over an extended period of usage that includes intermittent user activity that re-activates the LCD to full power.

Figure 4B:
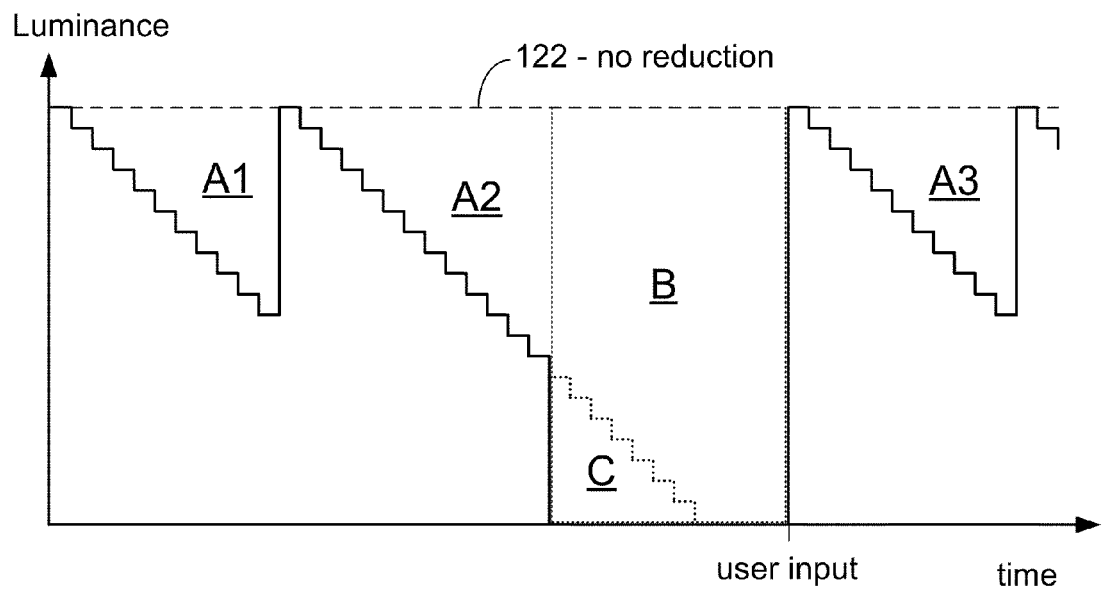
FIG. 4B illustrates stepwise power conservation according to the present invention over an extended period of usage that also optionally employs a shut off condition.

Another conventional technique shuts down the backlight when some non-usage condition has been met. For example, the condition may include a pre-determined duration of non-activity. FIG. 4B illustrates stepwise power conservation according to the present invention over an extended period of usage that includes intermittent user activity and also optionally employs a shut off condition.

For FIG. 4B, power conservation according to the present invention reduces power consumption (relative to the 'no reduction' line 122) over the time shown as the sums of areas A1+A2+A3+B if no shut off condition is used. Using the shut off condition increases power conservation to A1+A2+A3+B+C. The perceptible and practical difference is that video information largely remains visible, albeit at reduced luminance levels. Either option is suitable for use with the present invention. By contrast, areas B+C illustrate a conventional power conservation system that instantaneously plunges the backlight luminance level down to full shut off.

Figure 2B:
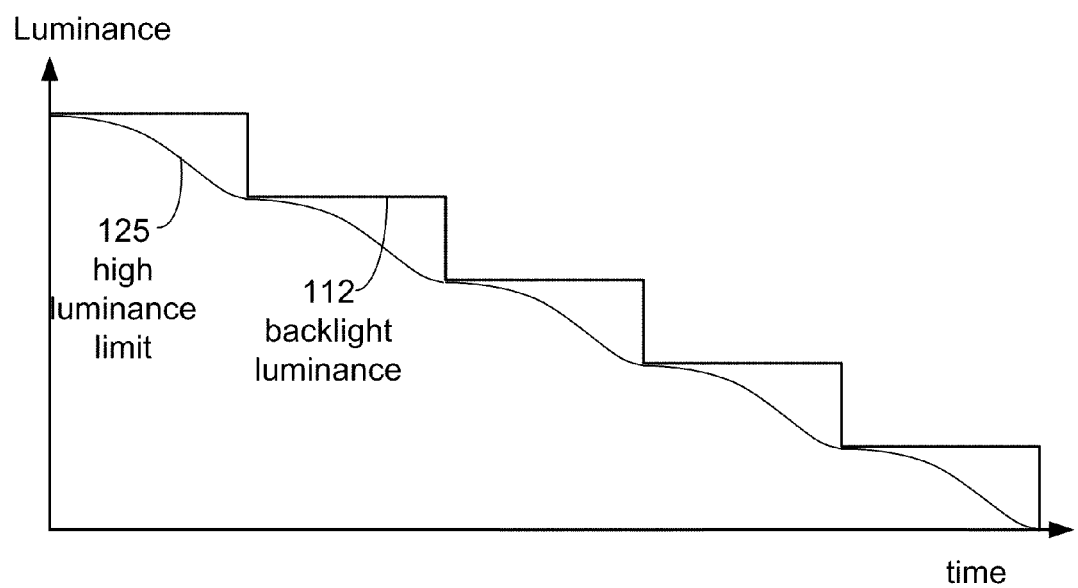
FIG. 2B illustrates an exemplary non-linear luminance progression of video information in accordance with another specific embodiment of the present invention.

As mentioned above, video information alteration may include any luminance verse time relationship that produces reduced transmissivity luminance levels and permits a backlit level change. FIG. 2B illustrates an exemplary non-linear luminance progression 125 of video information in accordance with another specific embodiment of the present invention. Other linear and non-linear progressions may be used.

The number of alterations will affect the degree of alteration at each interval. Thus, a greater number of alterations will produce smaller and less noticeable changes to the video information. In one embodiment, the present invention leverages the two degrees of freedom to provide visibly smooth video alterations that are not readily noticeable to a viewer.

In one embodiment, the present invention alters video information according to a human visual processing mechanism. More specifically, the present invention leverages one or more characteristics of human visual processing to decrease power consumption in a display device and provide visibly smooth video alterations. Human vision employs a number of processing and information reduction mechanisms that convert light into a biochemical signal. Generally, human perception of visual information such as luminance and color is a combination of the physical composition of a light beam (spectral composition, intensity, etc.), the physiological processes in the human eye, physiological processes in the optic nerves as a consequence of light stimulus in the eye, and processing of these stimuli in the brain.

One visual processing mechanism leveraged by the present invention relates to small alterations to video information that are below perception of the human visual system. Individually, each alteration is not typically perceptible by a person. Cumulatively, numerous such alterations will progressively change the video data and eventually arrive at a desired transmissivity that permits a backlight luminance change.

The question asked to avoid detection by a person is: what change in video output energy elicits the response "yes I saw something"? Or conversely, what change in video information elicits the response "no I didn't see a change"? One related visual expression of this issue is the minimum flicker criteria or minimum threshold border detection criteria. These visual processing criteria attempt to determine when a change is noticeable to a person. Generally, the human eye detects changes in luminance more readily than changes in color. While the human eye can differentiate about 10 million colors, this level of differentiation is usually achieved by making side-by-side comparisons. The human eye can only identify about 300 different colors from memory. Luminance and luminance differences are often more detectable, but vary with size of the image.

The luminance change required to elicit a detectable change will thus vary with the size of the LCD device. Another aspect of human perception is that colors/images covering a large area tend to appear brighter than colors covering a smaller area. This is referred to as area effect. The effect is often encountered in selecting paint samples from a swatch, for example. Selecting paint colors to be painted on a large wall based on small color samples having a small area often results in perceived errors. After looking at small sample pieces and selecting a paint (color and luminance) that looks good, people sometimes find that the same color looks too bright when painted on the wall. Similarly, size of the LCD device will affect perceived brightness, perceived changes in brightness, and alterations to video information that will or will not produce a perceived change.

In one embodiment, the present invention employs this size/luminance characteristic of human visual processing to provide visibly smooth video alteration. In this case, the present invention provides smaller and more frequent video alteration changes as size of the LCD display device increases (e.g., a laptop computer vs. a PDA or different size screens on a laptop). In a specific embodiment, transmissivity reduction includes about 1 percent of the maximum luminance transmissivity in an image available in the image (e.g., a maximum luminance transmissivity of 240 results in a reduction of about 2 for a white pixel and about 1 for a grayish pixel with a luminance of 120). Lesser and greater transmissivity reductions may be used to achieve video alterations that are not readily noticeable to a viewer. In general, the desired transmissivity, duration of time intervals used, and number of intervals needed to reach the desired transmissivity at a next backlight are all a matter of design choice and may vary according to a degree of desired noticeability and other design criteria such as the frequency of alteration desired and processing power consumption rates.

Video alteration may also employ a threshold inactivity time to determine when alterations to video information begin. This sets a user with a predetermined time in which the video information is not altered until some time of inactivity has been reached. The present invention may alternately alter video information immediately with inactivity. A user may set the threshold inactivity time via a graphics control. Once the threshold inactivity time has been reached, video alteration begins.

In one embodiment, after the threshold inactivity time, video alterations and power conservation may continue at set alteration intervals. The alteration intervals determine specific times after the threshold inactivity time at which further video alterations are applied. This allows the video information to gradually change—and power conservation to gradually increase—over time and according to varying design or user preference. A user may set the alteration intervals using a graphics control provided by a graphical user interface. In order for an alteration interval to be met, inactivity continues within the LCD for the duration of the interval. It is understood that the threshold inactivity time and alteration intervals are a matter of system design and user choice and may be different time periods.

Video alteration may employ one or more histogram manipulation techniques. In this case, the present invention builds a histogram for pixels in an image and reduces power consumption for the image using one or more histogram-manipulation techniques.

In one embodiment, the present invention implements a histogram shift that reduces transmissivity and luminance for all pixels in image by a common amount. As a result, the entire image becomes darker by subtracting a constant value from the luminance value for each pixel in the image. This effectively shifts a luminance histogram for the video information to a darker state. Such a luminance reduction may be implemented at a threshold inactivity time and at each alteration interval, for example.

The constant value may include a function of i) a maximum luminance for the image (such as a percentage), ii) a maximum luminance provided by the LCD device, iii) a mean, median or mode of luminance values for an image, or iv) a mean, median or mode of a luminance range values provided by the LCD device, etc. A suitable percentage of the maximum luminance for the image may range from about 2 percent to about 100 percent of the maximum luminance A suitable percentage of the maximum luminance for the display device may range from about 2 percent to about 10 percent of the maximum luminance provided by the display device. A 5 percent luminance reduction at the threshold inactivity time and each alteration interval thereafter steadily decreases luminance over time. Values less than 1 percent may be used for subtle and/or high frequency changes. While saving less power than a full 100 percent reduction, smaller alterations may be preferable to some users who prefer a less dramatic visual change. It is also understood that the percentage reduction at the threshold activity time and each alteration interval may be different levels. For example, a 5 percent luminance reduction may be implemented at the threshold inactivity time, while a 2 percent, 10 percent, or escalating (0.25, 0.5, 1, 2, 4, 6, 8, 10 percent, etc.) reduction may be used at each alteration interval.

Another embodiment alters pixel values in an image by compressing and shifting a luminance histogram. More specifically, a luminance histogram is first constructed for a set of pixels in the image (FIG. 3A). The histogram is then compressed, e.g., about the mean, median or mode. A shift subsequently reduces the luminance values for all pixels in the compressed set by a constant. One suitable constant is a number that gives a pixel with the lowest luminance value in the new compressed histogram a zero luminance. The image becomes darker since the final histogram luminance varies from zero luminance to a new maximum luminance produced as a result of the combined compression and shift. The compression and shift may be designed to produce a high luminance limit that is less than or about equal to a next lower backlight luminance level, or multiple compression and shifts may be applied to reach the next backlight luminance level in multiple steps.

Figure 3B:
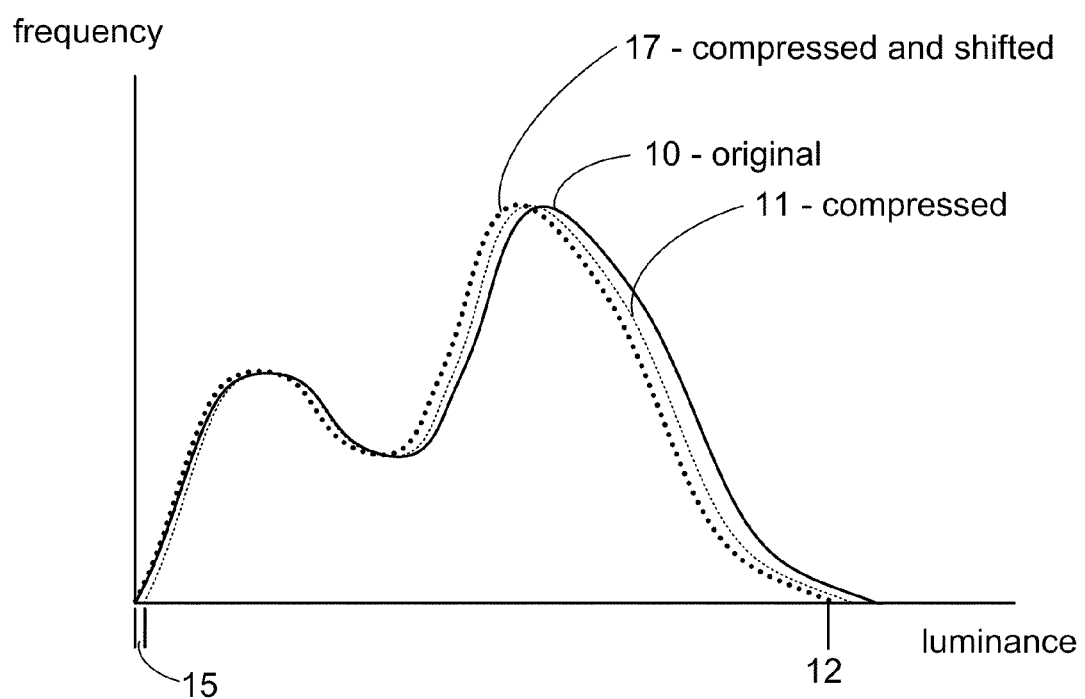
FIG. 3B shows the histogram of FIG. 3A after alteration in accordance with a specific embodiment of the present invention.

FIG. 3B shows a compression and shift applied to the histogram 10 of FIG. 3A. As shown, histogram 10 is compressed by 2 percent: 1 percent on the low end 1 percent on the high end. After the compression, all pixel luminance values in the compressed histogram 11 are decreased by a luminance difference 15 between a lowest luminance value for compressed histogram 11 and zero. A shifted and compressed histogram 17 results from the two operations and includes luminance values that vary from zero luminance to a new maximum luminance 12.

This combined compression and shift eliminates high luminance values in the image. Eliminating the high luminance video information eventually (in one or more combined compression and shifts) creates a new high luminance limit that permits a next backlight luminance to be used. A combined compression and shift also avoids turning lower luminance portions of the image to black, as may occur in a shift alone.

A suitable amount of luminance compression may range from about 0.1 percent to about 50 percent of histogram luminance range. Another suitable compression may range from about 1 percent to about 5 percent of the histogram luminance range. Compression and shifting may occur at the threshold inactivity time and at each alteration interval, if desired. This combined process may repeat at subsequent alteration intervals until a desired new high luminance limit is reached, or until a predetermined cutoff is reached. Suitable cutoffs include: when the maximum luminance value in the image reaches a predetermined minimum luminance, a predetermined inactivity time, when the histogram reaches a minimum width, or when the difference between subsequent iterations is minimal.

The present invention may implement other compression and shift schemes. In one embodiment, the luminance histogram for a set of pixels is compressed only on one side, e.g., on the high end. If the histogram compression occurs just on the high end of luminance values, the image becomes darker for brighter pixels only. If the histogram compression occurs only on the low end of luminance values and then a shift is applied, the image becomes darker for all pixels.

Although the present invention has primarily been discussed so far with linear and simple reductions in luminance for pixel values, a power conservation system designer may apply more complicated luminance reduction and power conservation schemes. The relationship between power reduction, video alterations, and time may be established according to system design. One suitable power conservation scheme applies stepwise reductions of predetermined values at predetermined times. Another power conservation scheme employs an exponential decrease in luminance values for pixels as time proceeds. In this case, luminance reduction starts slowly in an initial time span, increases gradually in some midpoint time span, and then increases sharply in a later time span. A non-linear reduction based on $y=F(x^2)$, where y is the current luminance reduction, x represents the ith alteration in a number of alterations over time, and $F(x^2)$ is some function that increases power conservation as inactivity time passes or increases exponentially with a number of alterations to the video information. Linear constants and other mathematical operators may be inserted into an equation to alter video alterations as desired.

Logic may also be applied in the video information alteration to achieve a desired luminance vs. time curve. For example, logic that limits further alterations to pixels in subsequent alteration intervals may be implemented. One suitable logic applies a lower limit that values of individual pixels may be reduced to, such as a percentage of an initial luminance. For example, luminance reductions may cease once a pixel reaches from about 5 percent to about 50 percent of its initial level—regardless of how it reached this point.

In another embodiment, luminance reduction occurs gradually over time at smaller intermittent time intervals (e.g., less than ten seconds) and small luminance alterations, as opposed to larger and less frequent alterations. This technique provides a more gradual power reduction without sharp or noticeable changes in video content. For example, luminance in an image may decrease 1 percent every 10 seconds, thereby decreasing luminance by 60 percent over ten minutes without a large and perceptible single change.

The present invention finds use with portable electronics devices, and particularly those powered by a battery. Since video power consumption largely influences overall power usage for many portable devices, power conservation as described herein extends operational longevity for the device when running on a battery, or other limited source of energy.

Figure 5A:
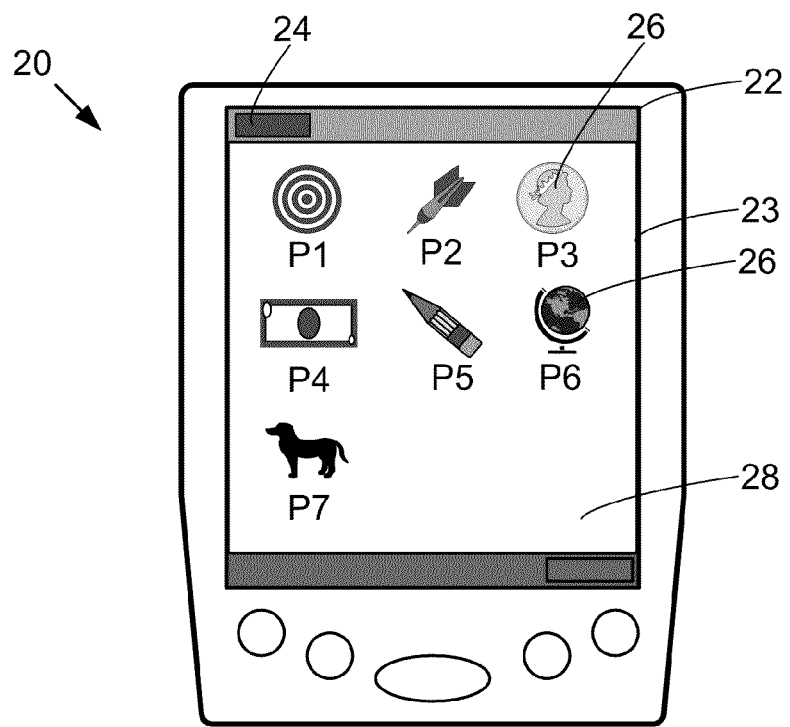
FIG. 5A illustrates a handheld computer device in accordance with one embodiment of the present invention.
Figure 5B:
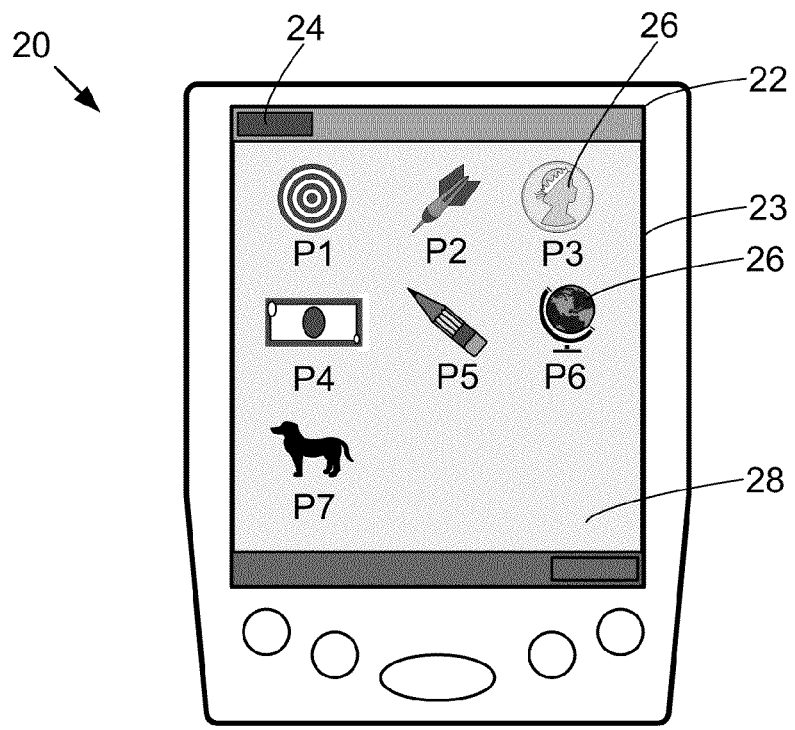
FIG. 5B illustrates the handheld device of FIG. 5A after video information alteration and backlight level reduction in accordance with a specific embodiment of the present invention.

FIG. 5A illustrates a handheld computer device 20 in accordance with one embodiment of the present invention. FIG. 5B illustrates handheld device 20 after video information alteration and backlight level reduction in accordance with a specific embodiment of the present invention.

Handheld computer device 20 includes an LCD device 22. LCD device 22 displays video information. Individual pixel locations within a display area 23 permit allocation and addressing of video information displayed on LCD 22. Pixel dimensions and resolution may characterize display area 23. For example, LCD 22 may offer pixel dimensions of 480× 640.

The video information refers to data for display on LCD 22 to produce a visual representation of the data. The video information is typically stored using values assigned to pixel locations and according to a pixel arrangement used for data storage and addressing. Exemplary color schemes suitable for assigning values to video information are described below.

The computer runs a graphics-based user interface 24 within display area 23. Interface 24 facilitates interaction between a user and device 20 and/or between the user and one or more programs run on computer device 20. To do so, interface 24 outputs video information on display device 20. As shown, interface 24 currently displays a background 28 and a set of icons 26 that each corresponds to a program available on device 20. The icons 26 are displayed on background 28, which includes its own set of background video information and provides a backdrop environment for graphics-based user interface 24.

The present invention decreases power consumption for device 20 by altering video information output on LCD 22. More specifically, the present invention alters video information such that LCD 22 can assume a lower backlight luminance level that consumes less power than the previous level. In one embodiment, video information is altered immediately and progressively at small amounts. In this case, the present invention conserves power immediately and continually (as opposed to after some predetermined inactivity time). In another embodiment, the changes do not begin until a predetermined inactivity time. Graphics-based user interface 24 may also shut down the entire LCD 22 after some predetermined time of inactivity to further increase power conservation. However, power conservation of the present invention has conserved significant power in the meantime.

It is also important to note that the present invention conserves power without substantially compromising usability of electronics device 20. More specifically, the video information is altered such that the person may still detect video information included in graphics-based user interface 24 and display area 23. Thus, a user may still detect the position of each icon 26 and visual information relevant for individual icon detection after video information has been altered. Similarly, a user may still read text included in the word processing program (e.g., black letters) while white information in the program is minimally altered to an off-white state.

While FIGS. 5A and 5B illustrate a handheld computer 20, power conservation techniques described herein are also well suited for use with a cellular telephones, portable music players, digital cameras, and other portable computing and electronics devices.

Figure 5C:
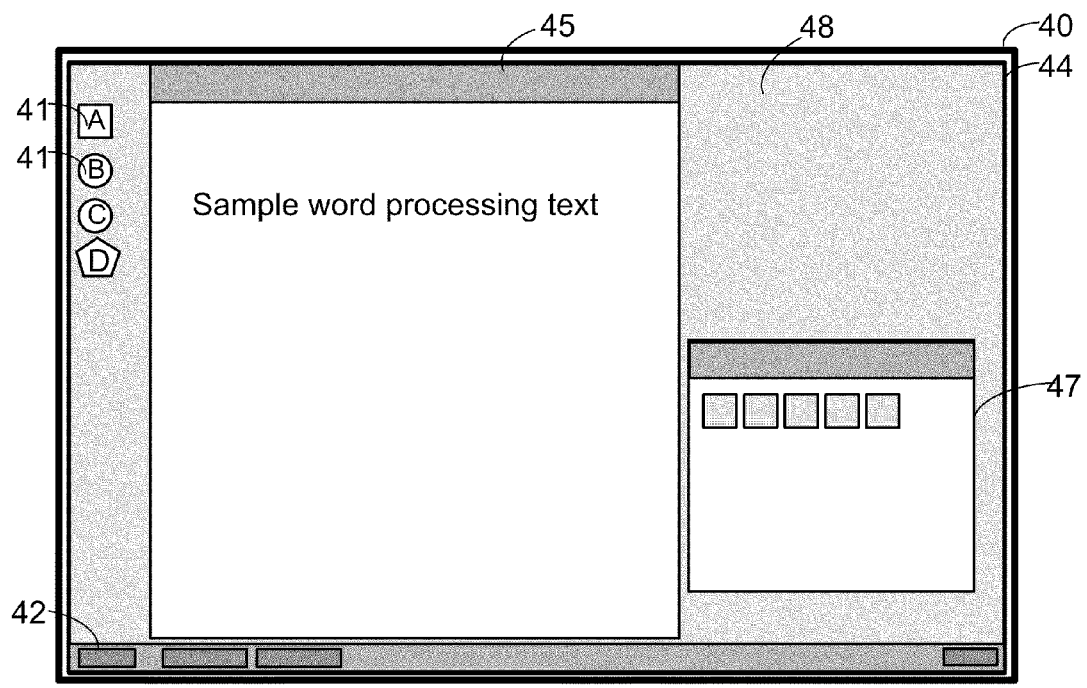
FIG. 5C illustrates an LCD device suitable for use with a laptop computer or desktop computer in accordance with one embodiment of the present invention.
Figure 5D:
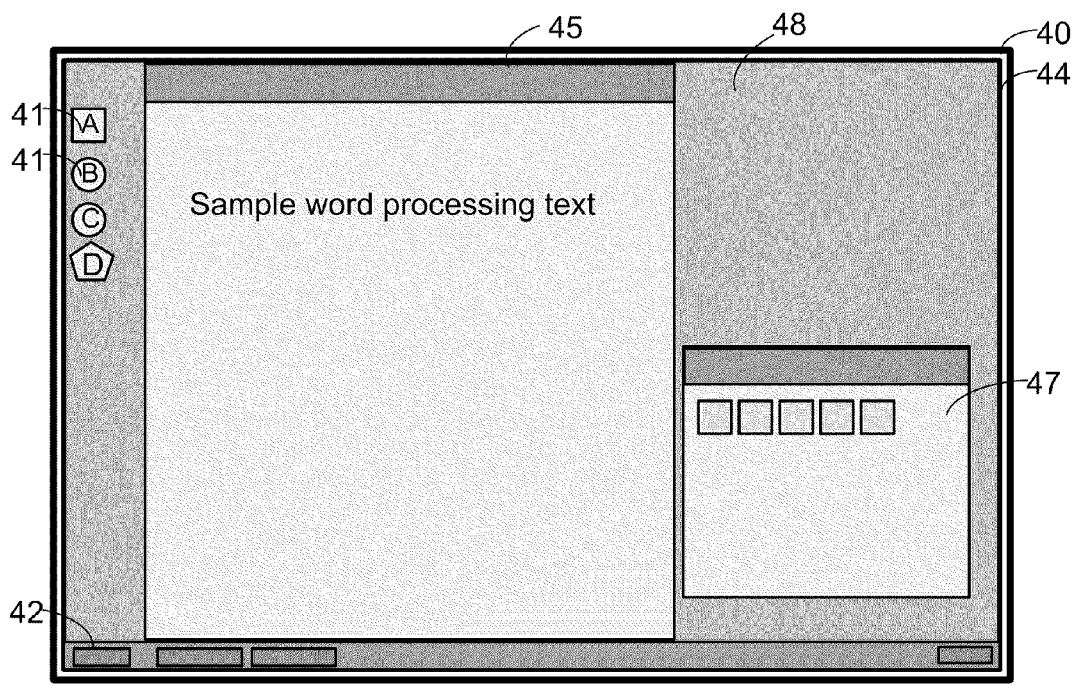
FIG. 5D illustrates the LCD of FIG. 5A after video information alteration in accordance with a specific embodiment of the present invention.

The present invention also finds use with larger LCD devices and electronics devices. For example, desktop and laptop computers with 15-17" display areas, measured diagonally, are now common. FIG. 5C illustrates an LCD device 40 suitable for use with a laptop computer or desktop computer in accordance with one embodiment of the present invention. FIG. 5D illustrates LCD 40 after video information alteration and backlight level reduction in accordance with a specific embodiment of the present invention.

LCD 40 outputs video information for the laptop computer within a display area 44. A graphics-based user interface 42 facilitates interaction between a user and the laptop computer and/or between the user and one or more programs run on the laptop computer. Interface 42 currently outputs video information for graphics components 45 and 47, icons 41 and background 48. Graphics components 41, 45 and 47 are each for display as discrete visual objects and include video information related to a program stored and/or run on the computer. Common programs include word processing programs, file navigation displays, Internet Browsers, drawing programs, music player programs, and video games, for example. In this case, video information has been altered and the backlight level has been reduced, turning all information in display area 44 darker.

Having discussed exemplary power reduction techniques and electronics devices, power conservation implementation will now be described in further detail.

Figure 6A:
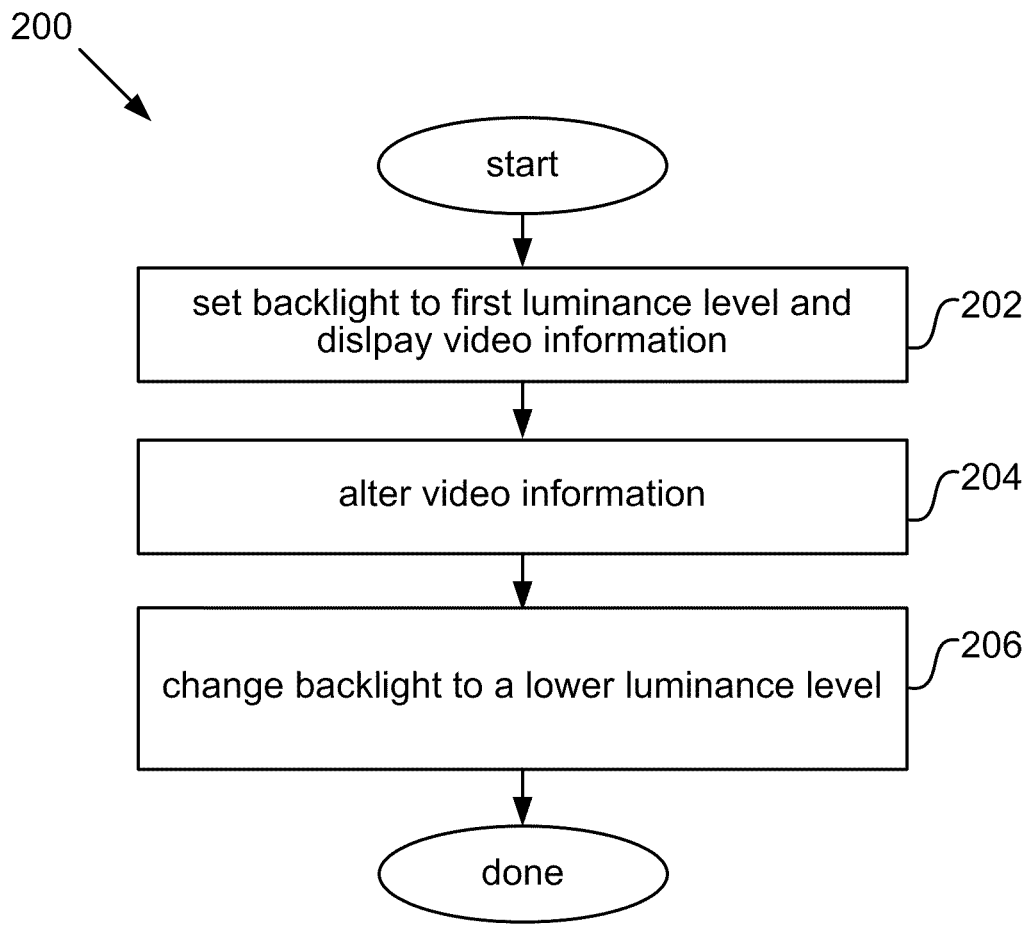
FIG. 6A illustrates a process flow for reducing power consumed by a display device in accordance with one embodiment of the invention.
Figure 6B:
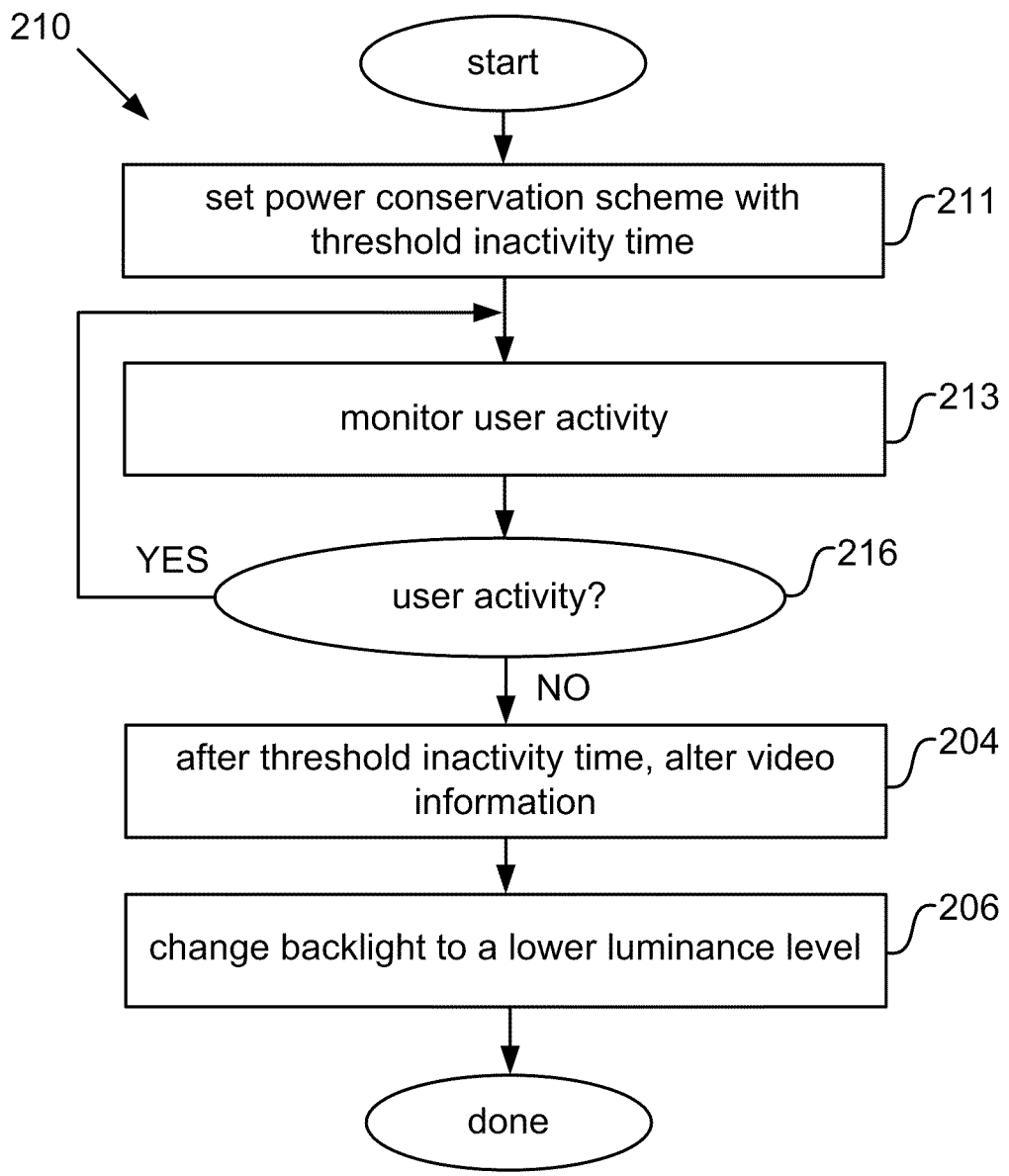
FIG. 6B illustrates a process flow for reducing power consumed by a display device in accordance with another embodiment of the invention.

FIG. 6A illustrates a process flow 200 for reducing power consumed by an LCD device in accordance with one embodiment of the invention. While the present invention will now be described as a method and separable actions for reducing power consumption, those skilled in the art will recognize that the subsequent description may also illustrate hardware and/or software systems and components capable of performing the method and actions.

Process flow 200 begins by setting a backlight included in an LCD device to a first luminance level and displaying video information using the LCD (202). This typically corresponds to active usage when a user is interacting with a program on the electronics device.

At some point, and while the backlight is at the first luminance level, process flow 200 then alters video information for output on the LCD to produce altered video information (204). Examples of when the video data is altered are given below. Alteration may include reducing transmissivity and luminance of video information to generate a new high luminance that is less than or about equal to a second backlight luminance level offered by the backlight. Alteration to this new high, such as a maximum luminance in the histogram, may be done in one or more discrete stages, and may include any mathematical or logical operation on the RGB data provided to pixilated filters in the LCD. Conversion between RGB and HSL allows changes to be readily implemented using luminance values. This also maintains hue and saturation, although the present invention also works well with altering these if desired. The luminance reduction may include, for example, a histogram compression and shift as described above.

Once the new high luminance has been reached, the backlight is changed to a new and lower backlight luminance level (206). This reduces power for the LCD device according to the power consumption difference between the old and new backlight luminance levels. In one embodiment, pixelated transmissivity of the video data simultaneously increases with the backlight reduction so as to minimize any change in the aggregate luminance for the image and individual pixels. In some cases, the aggregate luminance remains relatively constant for all pixels in the image, while in other instances the aggregate luminance or individual pixel luminance values may change slightly.

In one embodiment, video information alteration is immediate and continuous. In other words, video alteration occurs immediately upon start up, continues as inactivity proceeds, and causes backlight luminance levels to intermittently and progressively drop until the electronics device or LCD is a) refreshed by user activity, b) turned off, or c) shut down after a certain period of inactivity according to stored power conservation instructions implemented by a graphical user interface.

In a temporally varying embodiment, the present invention uses a threshold inactivity time to determine when alterations to video information begin. A user may set the threshold inactivity time via a graphics control provided by a graphics-based user interface run on the electronics device.

FIG. 2B illustrates a process flow 210 for reducing power consumed by a display device in accordance with another embodiment of the invention. Process flow 210 begins by setting a power conservation scheme (211). A power scheme refers to a collection of power options that dictate how and when video information is altered to reduce LCD device power consumption. In one embodiment, a power conservation system is stored on a computer and implements a power conservation scheme without user input. In another embodiment, a graphics control, which opens in a separate window upon initiation, allows a user to set a power scheme or one or more power options corresponding to techniques described herein. Parameters set by a user may include the rate or amount of luminance reduction, whether a cutoff is used, a threshold inactivity time, interval time period lengths between successive alterations, specific histogram techniques used, other power conservation parameters described herein, or another suitable conservation parameter.

After the power conservation scheme has been established, process flow 210 monitors user activity within the display area (213). Process flow 210 continues to monitor activity over time and reacts according to any user activity or lack thereof (216). If user activity occurs in the display area, process flow 210 then resets the inactivity monitor clock and returns to 213. If user inactivity continues until the threshold inactivity time, then process flow 210 alters video information in the image according to a change provided in the power scheme for the threshold inactivity time (204). For example, all video information in the entire display area may be reduced by a small scalar luminance value to reduce transmissivity. In one embodiment, the present invention employs a threshold inactivity time from about 10 seconds to about 1 hour. In another embodiment, the present invention employs a threshold inactivity time from about 1 minute to about 10 minutes. Process flow 200 is not limited to any specific threshold inactivity time.

The alterations may repeat during user inactivity until a new high luminance has been reached that is less than or about equal to a next backlight luminance level for the LCD. Once the new high luminance has been reached, the backlight is changed to a new and lower backlight luminance level (206).

In another temporally varying embodiment, alterations to video information may occur at set alteration intervals. The alteration intervals determine specific regular times at which minor but progressive video alterations are applied. For example, progressive and minor changes to RGB values of video information may occur every ten seconds to eventually create video information that fits under a next backlight luminance level. To determine the alteration at each interval in the progression, the difference between luminance values (and RGB after HSL/RGB conversion) at start (current histogram values before any changes) and luminance values at finish (when ready for backlight change) may be divided by the number of intervals. As mentioned above, more complicated and non-linear profiles may be used other than simple linear progressive changes. This embodiment allows the video information and transmissivity to gradually change over time in relatively small increments. This also minimizes noticeability of the alterations to a viewer, and reduces chances that a user will detect any single alteration.

Figure 6C:
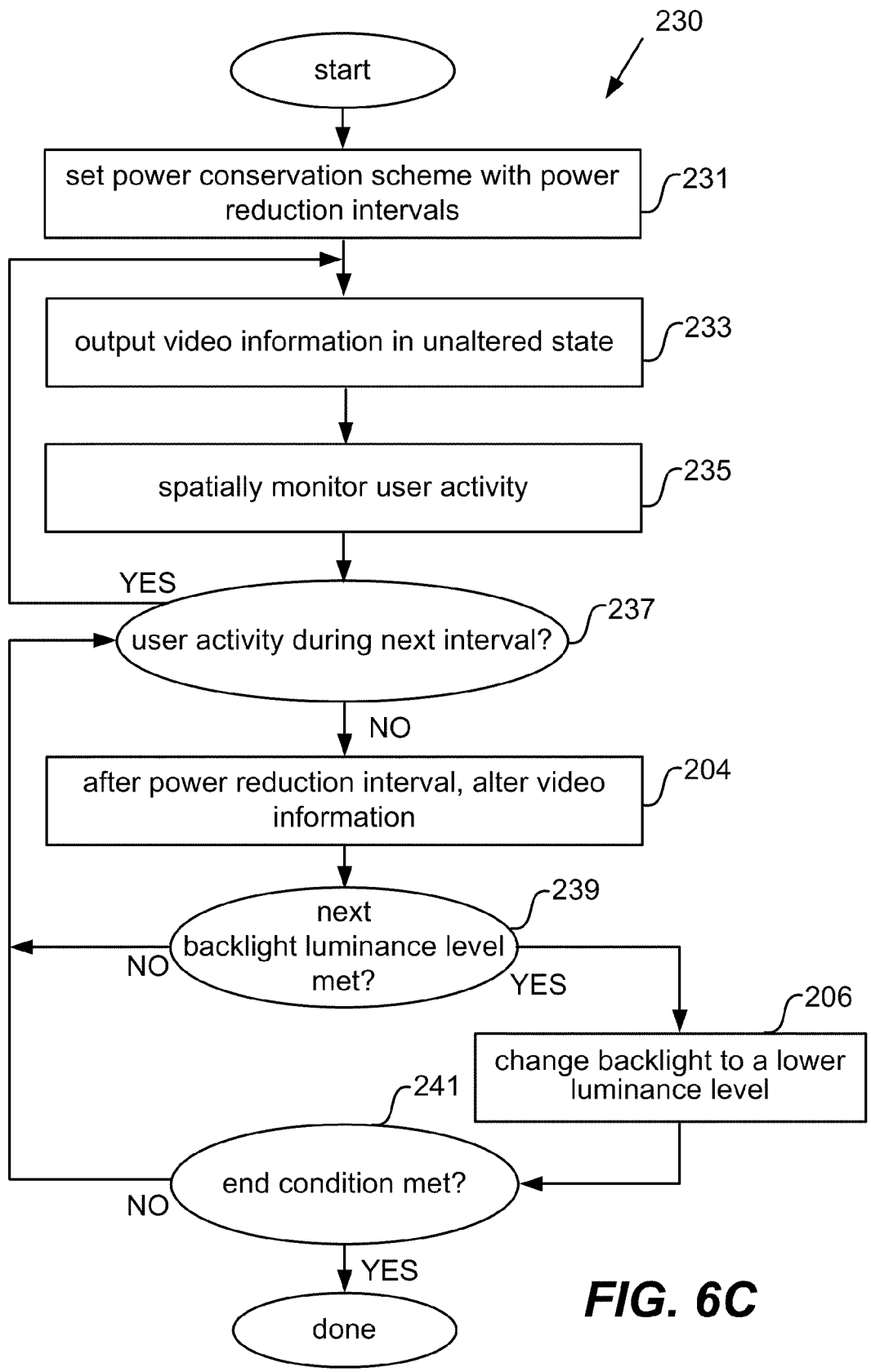
FIG. 6C illustrates a process flow for reducing power consumed by a display device in accordance with another embodiment of the invention.

FIG. 6C illustrates a process flow 230 for reducing power consumed by a display device in accordance with another embodiment of the invention. Process flow 230 begins by setting a power conservation scheme (231). For process flow 230, the power conservation scheme designates an alteration interval at which video information is altered, and may also set how an alteration type such as linear, non-linear, a particular histogram manipulation at each interval, etc.

The video information is initially output and displayed on the LCD in an unaltered state (233). Process flow 230 then monitors user activity (235).

If user activity occurs during any time in process flow 230, then the method returns to displaying the video information in an unaltered state (233) and monitoring user activity with a reset clock for inactivity (235).

If no activity occurs for an alteration interval, video information in the image or a portion thereof is altered (204). Process flow then checks if the high luminance limit has met the next backlight luminance level (239). If not, then process flow 230 returns to monitoring user activity (235). If the alteration permits the next backlight luminance level to be used, then the backlight is changed to a new and lower backlight luminance level (206). This may also change transmissivity of the pixilated video information to minimize the aggregate change, as described above.

Alterations to video information then continue at set alteration intervals (237, 204, 239, and 206). In order for another alteration interval to be met, inactivity continues for the duration of the next interval (237). To attain another backlight luminance reduction, progressive alterations continue until the next backlight luminance requirement is met (206).

The gradual rate of alteration may be established according to power conservation system design or user preference, and advantageously allows video information to alter without substantially noticeable momentous changes. A magnitude for each incremental alteration may be determined by dividing a desired total alteration over a period of time by the number of intervals in the time period. For example, the progressive changes may occur as often as desired to produce a backlight luminance level change every 30 seconds. The backlight luminance level change may then occur without changing the aggregate luminance perceived by a user.

Progression may then continue based on user inactivity and according to a predetermined power scheme. At some point, a stop condition may be met (241) Some suitable stop conditions include when a histogram for the set of pixels reaches a minimum width, the backlight has reduced to its lowest state (off—or no light), when a certain number of backlight levels have changed, a certain time has expired, or when a maximum luminance value in the image reaches a predetermined minimum luminance. If the lower limit has been met, process flow 230 finishes. With no user activity, steps 237, 204, 239, and 206 repeat until the stop condition has been met. In addition, if user activity occurs (237) before the next alteration interval, process flow 230 restores the video information to its original state before any alterations were applied.

In one embodiment, an alteration interval from several milliseconds to about 3 minutes is suitable. In another embodiment, an alteration interval from about 1 second to about 10 seconds is suitable. It is understood that alteration intervals are a matter of system design and user choice and may be include different time periods that those specifically provided herein.

Altered video information that was altered after a threshold inactivity time and/or alteration interval returns—or reactivates—to its original state from an altered state after user activity, or after some activity in the program designated as active by a power conservation program designer. Reactivation displays the original video information as it was initially displayed before any alterations. In a specific embodiment, positioning a pointer in the display area or graphics component triggers reactivation and returns the display to an initial state. Power conservation system designers may also customize reactivation rules and apply different conditions, as one of skill in the art will appreciate.

Figure 7A:
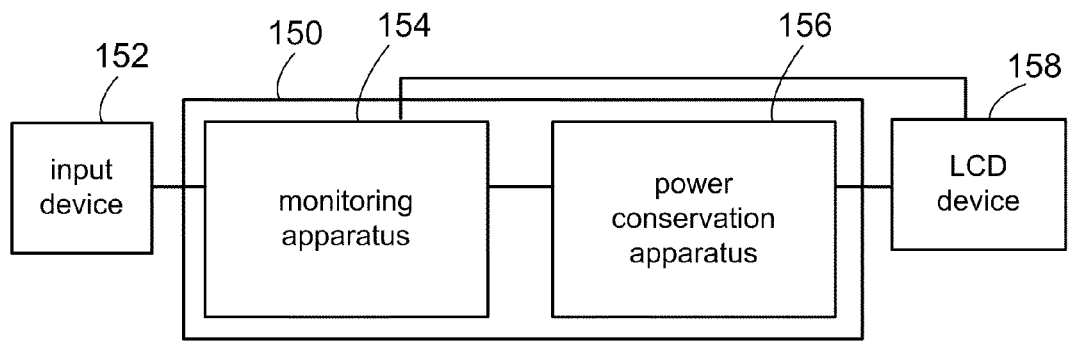
FIG. 7A illustrates a system for reducing power consumed by a display device in accordance with one embodiment of the present invention.

The present invention also relates to systems for conserving power for an electronics device or display device. FIG. 7A illustrates a system 150 for reducing power consumed by an LCD device 158 in accordance with one embodiment of the present invention. While the present invention will now be described as an apparatus composed of units, those skilled in the area will recognize that the present invention encompasses a method, process or software having as steps the actions performed by each unit and described below.

System 150 comprises monitoring apparatus 154 and power conservation apparatus 156. In general, system 150 may comprise any combination of software and hardware for carrying out actions described herein. In one embodiment, monitoring apparatus 154 and power conservation apparatus 156 are implemented solely in software stored on a computer and run by a processor (such as a video or graphics chip or main processor). In another embodiment, general-purpose computer processing units, instead of dedicated hardware, implement the monitoring and video alteration techniques described herein.

Coupled to system 150 are input device 152 and LCD device 158. Input device 152 allows a user to position a pointer within a display area of LCD 158. Some popular input devices include a mouse, a position-sensing pad on a laptop computer, a stylus working in cooperation with a position-sensing display on a PDA, a positioning knob included on a keyboard of a laptop computer, one or more arrow keyboard keys, one or more buttons on a PDA, etc.

Monitoring apparatus 154 is designed or configured to monitor user activity in a display area for LCD 158. To do so, monitoring apparatus 154 is configured to receive digital information from input device 152 that describes spatial input from a user and is configured to access digital representations of spatial areas for individual graphics components in the display area. Monitoring apparatus 154 then compares digital information from input from device 152 and the digital representations, and characterizes the user activity. Monitoring apparatus 154 may also provide temporal information with regard to user activity by referencing user activity against temporal information received from a clock source. On one or more output lines, monitoring apparatus may output user activity information including: a) active and inactive portions of the display area, b) spatial information based on the position(s) of a pointer operated by the user, and c) temporal information related to user activity, such as an amount of time that an image has maintained an active or inactive status, respectively.

Power conservation apparatus 156 is designed or configured to receive user activity information produced by the monitoring apparatus 154. Power conservation apparatus 156 is designed or configured to alter video information. Several suitable techniques that reduce power consumption for LCD 158 based on video information alterations were discussed above. Power conservation apparatus 156 outputs the altered video information to LCD 158. While apparatus 156 has been described as a discrete device, those skilled in the art will realize that apparatus 156 may include software that outputs a control signal useful for altering video information.

LCD 158 displays video information. In one embodiment, LCD 158 outputs video information onto a screen including array of individually addressable pixels. LCD 158 receives the altered video information from power conservation apparatus 56, or a buffer included in or associated with apparatus 156, and displays the altered video information.

LCD 158 varies its power consumption with video output. In one embodiment, display device 158 comprises a backlit LCD screen. For many LCD devices, power consumption is proportional to luminance for the backlight and the LCD comprises a set of controllable luminance levels (e.g., from 1-10) that each increasingly generates more light and consumes more power. LCD displays for many handheld devices include relatively less stepwise luminance levels (e.g., less than 10), while LCD displays for many laptop computers include more stepwise luminance levels (e.g., 10 or more).

Controlling red, green and blue transmittance elements for each pixel according to RGB based video information produces individual colors and luminance for each pixel in the LCD. In one embodiment, all video information is scaled in transmittance based on a next progressive luminance level. In another embodiment, select portions of the video information are scaled in transmittance to achieve the new backlight luminance level. Other techniques may be used, and the alterations need not be done to all video information in an image. For example, the present invention may first alter white information (as determined by some white threshold) to reduce the highest luminance data and attain a first backlight change. Alternatively, individual graphics components may be separately altered based on user activity on the graphics components.

In general, the present invention is suitable for use with any LCD device not limited to any particular LCD design. In one embodiment, LCD 158 includes a backlit LCD screen that varies power consumption according to a level of backlight luminance currently employed. The backlight provides light onto one or more LCD panels. Some LCD devices include a single backlight, others include multiple, and the present invention is suitable for use regardless of the number or arrangement of light sources. The backlight may include a lamp, one or more LEDs or any other suitable light emitting technology. Most backlights produce white light, and a few produce non-white light and rely on color conversion in the filtering to produce a suitable gamut.

Although the present invention has so far been described with respect to backlit LCD devices, other types of variable power display devices may be used. In general, the present invention is independent of any particular display device, any mechanism of light generation for a display device, or any power consumption scheme for a display device, and only assumes that power consumption for the display device 158 may vary with video information and luminance levels. In a specific embodiment, display device 158 can vary power consumption spatially.

One such spatially varying display device employs organic light emitting diodes (OLED) for video output. OLED displays are current driven devices where the intensity of light output from an OLED display is proportional to electrical current flow. Power output for the OLED device spatially varies by controlling and modulating electrical current levels through individual elements that are arranged for each pixel. For a color display, each pixel usually comprises three OLED element assemblies: one for red light, a second for blue light, a third for green light. Each assembly produces the color light directly or uses a colored filter, and RGB values are produced according to current input proportional to an RGB value, say from 0 to 255. Reducing RGB values for individual pixels—or RGB values via a luminance reduction—as described herein reduces power consumption for each assembly and each pixel, thereby cumulatively reducing current and power requirements for the an OLED display device. OLED displays are becoming increasingly popular for portable and battery powered devices, making power conservation techniques described herein particularly useful to conserve limited quantities of battery power. In another embodiment, display device 58 comprises a backlit LCD screen. In a specific embodiment, power conservation is attained by reducing backlit luminance for the entire screen or portions thereof while increasing transmittance for active areas at the reduced luminance.

Figure 7B:
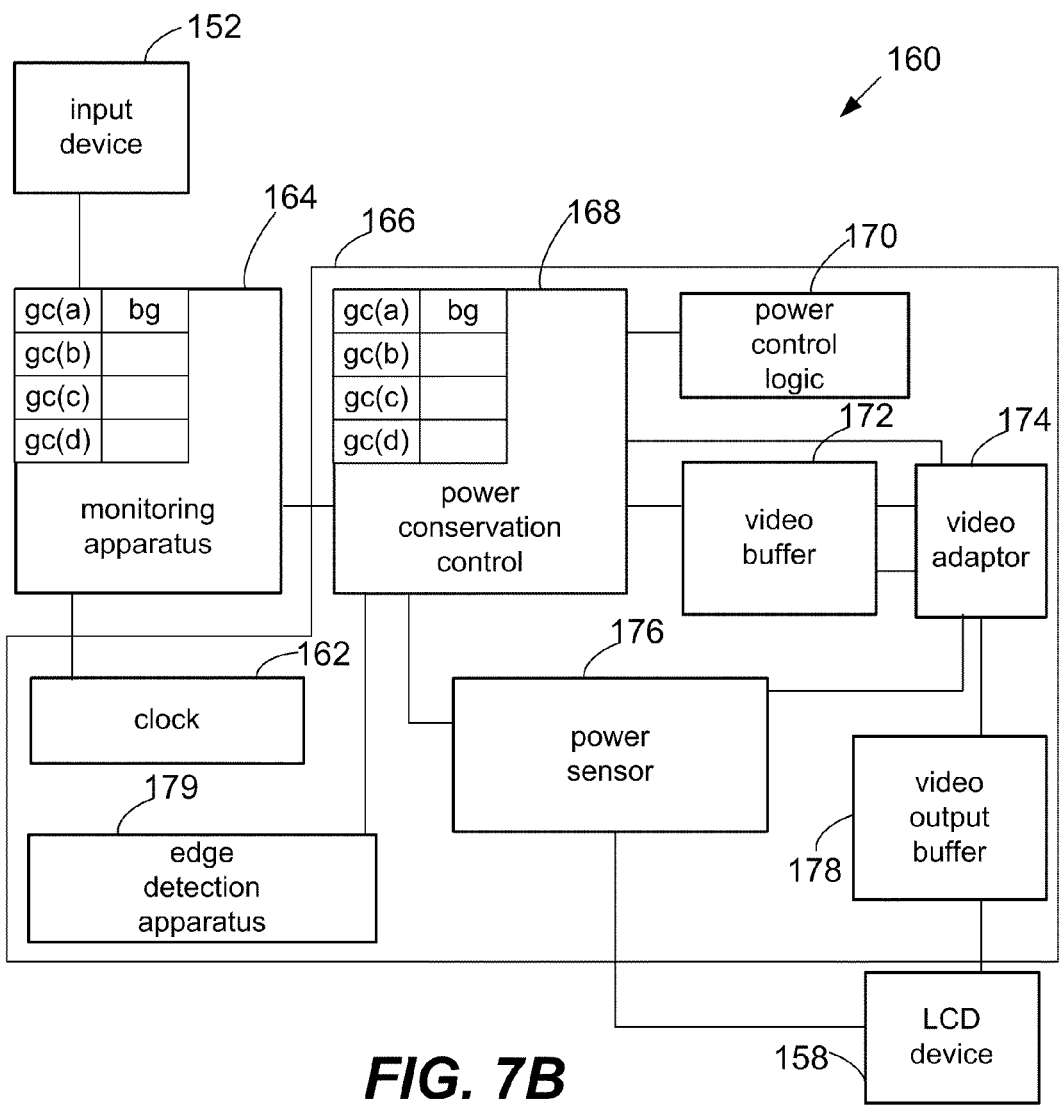
FIG. 7B illustrates a system for reducing power consumed by a display device in accordance with a specific embodiment of the present invention.

FIG. 7B illustrates a system 160 for reducing power consumed by LCD device 158 in accordance with a specific embodiment of the present invention. While this embodiment of the present invention will now be described as an apparatus composed of units, those skilled in the area will recognize that the present invention encompasses a method, process or software having as steps the actions performed by each unit and described below.

System 160 comprises monitoring apparatus 164 and power conservation apparatus 166. Input device 152 and LCD 158 were described with respect to FIG. 7A. Power conservation apparatus 166 comprises power conservation control 168, clock 162, edge detection apparatus 179, power control logic 170, at least one video buffer 172, video adaptor 174, power sensor 176, and at least one output video buffer 178. Each of the components for system 160 may be implemented in hardware, firmware or software, or a combination thereof. It should be noted that the functionality associated with a particular component may be centralized or distributed, whether locally or remotely.

Monitoring apparatus 164 separates a display area into an active graphics component based on user activity in a perimeter of the active graphics component. The perimeter defines the active portion and one or more inactive graphics components that are outside the active portion. In this case, display area includes four graphics components and monitoring apparatus 164 stores, or accesses data storage facilities that store, the position and parametric spatial boundaries for graphics components GC(a), GC(b), GC(c), GC(d) and a background. Based on user activity within the display area, monitoring apparatus designates any one of GC(a), GC(b), GC(c), GC(d) and the background as the active graphics component. The designation is based on user activity in a perimeter of one of the graphics component. The perimeter for this active graphics component then defines the active portion of the display area. The display area outside this perimeter defines the inactive portions of the display area. The other graphics components in this inactive area are then designated as inactive. For example, if GC(b) is designated as active, graphics components GC(a), GC(c), GC(d) and the background are designated as inactive. Monitoring apparatus 164 has an input that from input device 152, shape detection apparatus 179 and an input that receives temporal calibration from clock 162 and provides temporal information with regard to user activity. Monitoring apparatus 164 has an output that provides user activity information.

Power conservation apparatus 166 alters video information. Power conservation control 168 has an input that receives user activity information from monitoring apparatus 164, an input from clock 162 that receives temporal information, an input from edge detection apparatus 179 that receives perimeter information if needed, input from sensor 176 that receives an indication of power consumption, and an input from power control logic 170 that receives stored logic according to power conservation techniques described herein. Power conservation control 168 determines how video information is altered to reduce power.

Power conservation control 168 determines an alteration to video information according to stored power conservation logic, and outputs a signal indicative of the alteration. To do so, control 168 coordinates input from monitoring apparatus 164, clock 162, power sensor 176, and power control logic 170. For example, control 168 may implement a luminance reduction scheme for a set of pixels once a threshold activity time has been reached. Magnitude and timing of the luminance reduction are determined according to stored instructions acquired from power control logic 170. Input from clock 162 is used to determine when the threshold activity or alteration interval time has been reached and when to apply the luminance reduction.

Power conservation control 168 is also configured to receive input from monitoring apparatus 164 to determine when to reactivate an image. Thus, in response to user activity, control 168 reactivates the video information as it was existed before any alteration. To facilitate reactivation, video information that was altered may be stored as it existed without any alterations in video buffer 172.

Power control logic 170 stores data and instructions that allow a processor to implement the techniques described herein. For example, power control logic 170 may include nonvolatile memory that stores timing parameters for a threshold inactivity time and alteration interval established by a user. In one embodiment, the logic stores instructions that allow the user to set a threshold inactivity time and alteration interval amongst a range of possible values. In another embodiment, the logic stores instructions that are implemented by design with no user input. Logic 170 may also store instructions that convert pixel values between color schemes to reduce transmissivity of red, green, or blue pixels.

Video buffer 172 couples to an input of video adaptor 174 and stores video information. Video buffer 172 stores video information whose transmissivity has been altered to facilitate a backlight change. Video buffer 172 may also store altered video information between consecutive alterations. More specifically, altered video information that exists before a first threshold inactivity time may be stored within video buffer 172, and stored before each subsequent alteration according to continuous alteration intervals. Although video buffer 172 is illustrated as a single unit, it is understood that buffer systems may employ one or more discrete storage components. In particular, different a buffer may be used to store video information without any alterations than a buffer used to store altered video information in between multiple alteration intervals. One or more RAM memory components are suitable for use as video buffer 172.

In one embodiment, power conservation control 168 does not change video information and relies on outside source to do so. In this case, power conservation apparatus 166 includes a video adaptor 174 that receives a signal produced by power conservation control 168 and alters video information based on the signal. Video adaptor 174 creates a set of signals that display pixelated video information for an image. Video adaptor 174 may correspond to a graphics controller, graphics co-processor, graphics accelerator, or other video controller that is commercially available from a variety of vendors. Such controllers are often available as cards that include a separate circuit board with memory and a dedicated processor. Video adaptor 174 may already be implemented within a computer system, as is common in desktop or laptop computer systems. An output line of video adaptor 174 provides the altered video information. In one embodiment, video adaptor 174 converts digital information to analog information. In another embodiment, the data remains digital.

Output video buffer 178 is configured to receive the altered video information from an output of video adaptor 174. One or more RAM memory components are suitable for use as video buffer 172.

A clock 162 provides a temporal reference for user activity. Output lines for clock 162 are coupled to inputs for monitoring apparatus 164 and/or power conservation control 168; and provide a temporal signal to monitoring apparatus 164 and/or power conservation control 168. Most computer systems include a digital clock suitable for use as clock 162. Temporal information from clock 162 may be useful to allow power conservation apparatus 166 to alter video information after a threshold inactivity time of inactivity. In addition, temporal information from clock 162 allows power conservation apparatus to timely apply a second alteration to the altered video information after a first alteration interval.

In one embodiment, system 160 comprises a power sensor 176 that monitors power consumption—both active in the LCD and/or as predicted in software. Power sensor 176 may: detect power actively consumed by display device 158, estimate power consumption based on video output from video adaptor 174, track available power resources provided by a battery, and estimate power conservation and savings based on control signals and alterations to video output provided by control 168. Power sensor 176 is coupled to power conservation control 168. In one embodiment, power sensor 176 provides an estimation of power savings and consumption achieved by the present invention. This may include cumulative mathematical analysis backlight level vs. time, for example. In a specific embodiment, power sensor 176 couples to video adaptor 174 and provides an estimation of power savings and consumption based on the altered video information output from video adaptor 174.

An estimation of power consumption may also be provided without any alterations, which is useful for comparative purposes and quantifying conservation. An output line of power sensor 176 couples to an input of power conservation control 168 and allows control 168 to alter video output based on one or more of: power actively consumed by LCD 158, video output from video adaptor 174, and available power provided by a battery, all of which can be combined with estimated power conservation for alterations to video information determined by control 168.

In one embodiment, system 160 also employs an edge detection apparatus 179 that facilitates spatial mapping of graphics components. Thus, edge detection apparatus 179 may be called upon by monitoring apparatus 164 to produce perimeter information for graphics components that do not readily include characteristic perimeter information in their bitmap. Edge detection apparatus 179 then probes video information for a graphics component (such as that included in a bitmap for the graphics component), builds a perimeter or shape based on the video information, and outputs the perimeter information for the graphics component to one of monitoring apparatus 164, power conservation control 168 or buffer 172 for storage therein.

In one embodiment, white power conservation as described herein is implemented without user control. In another embodiment, a computer system provides a user the ability to turn on/off power conservation or tailor the power conservation to personal preferences.

The present invention also relates to controls for implementing power conservation. Graphics-based user interfaces employ what are referred to as graphics "controls". A graphics control is a discrete video object, for display by a display device, which can be manipulated by a user to alter one or more graphics outputs or effects and/or to initiate an action in an associated application program. The graphics control often includes its own bitmap comprising an array of pixel values.

Although the present invention has been described so far with respect to alterations in video information and power conservation according to a RGB color scheme, video information alterations may also be applied in other color schemes, as one of skill in the art will appreciate. An HSL color scheme characterizes video output according to a wavelength or color (hue), degree of purity of the color—or degree of separation from gray having the same color (saturation), and degree of brightness for the color ranging from black to white (luminance). Cyan, magenta, yellow and black (CMYK) is another color scheme regularly used to characterize video output from display device according to combinations of cyan, magenta, yellow and black values. In general, power conservation techniques described herein may be implemented via regardless of the color scheme used to store the video information or employed by a graphics-based user interface, video controller or display device. Alterations and video conservation as described herein may also apply to black and white video output.

Translation between the color schemes is well known to one of skill in the art. Although the present invention has been described so far with respect to video information alterations in an RGB scheme, one of skill in the art will appreciate that power conservation techniques described herein may be programmed or stored according to one color scheme, and output according to another color scheme for the display device. For example, video data manipulation techniques described herein may be programmed or stored in an HSL scheme, and then converted to and implemented on an RGB based display device. Most LCDs employ an RGB color scheme for video output.

Figure 8:
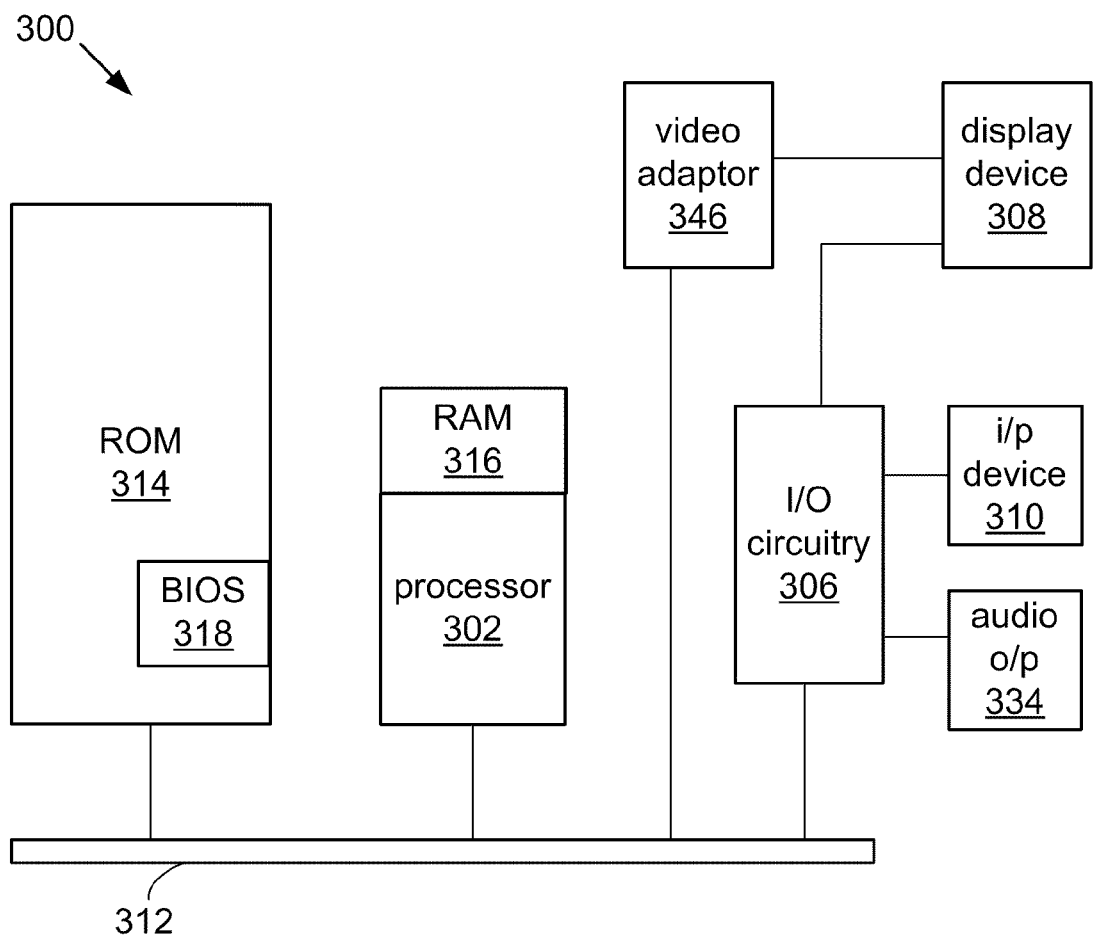
FIG. 8 illustrates an exemplary computer system suitable for implementing the invention.

The present invention finds use with computer systems such as desktop and laptop computers, personal digital assistants (PDAs), cellular telephones, digital cameras, portable computer systems, and the like. FIG. 8 schematically illustrates an exemplary general-purpose computer system 300 suitable for implementing the present invention.

Computer system 300 comprises a processor, or CPU, 302, one or more memories 314 and 316, input/output (I/O) circuitry 306, display device 308, input device 310, and system bus 312. System bus 312 permits digital communication between system processor 302 and ROM 314, as well as permits communication between other components within system 300 and processor 302 and/or ROM 314.

System 300 memory includes read only memory (ROM) 314 and random access memory (RAM) 316. Other memories may be included, such as another RAM module that separately couples to bus 312. ROM 314 stores a basic input/output system 318 (BIOS), containing basic routines that help to transfer information between elements within computer system 300, such as during start-up. Computer system 300 may also include a hard disk drive and an optical disk drive, for example. The optical disk drive reads from and may write to a CD-ROM disk or other optical media. The drives and their associated computer-readable media provide non-volatile storage for system 300. A number of program modules may be stored in the drives, ROM 314, and/or RAM 316, including an operating system, one or more application programs, other program modules, and program data. Although data storage above refers to a hard disk and optical disk, those skilled in the art will appreciate that other types of storage are suitable for use with a computer system, such as magnetic cassettes, flash memory cards, USB memory sticks, and the like. In addition, not all computer systems, such as PDAs and other portable devices may include multiple external memory options.

Processor 302 is a commercially available microprocessor such as one of the Intel or Motorola family of chips, or another suitable commercially available processor. Processor 302 digitally communicates with ROM 314 via system bus 312, which may comprise a data bus, control bus, and address bus for communication between processor 302 and memory 314.

CPU 302 is also coupled to the I/O circuitry 306 by system bus 312 to permit data transfers with peripheral devices.

I/O circuitry 306 provides an interface between CPU 302 and such peripheral devices as display device 308, input device 310, audio output 334 and/or any other I/O device. For example, a mouse used as input device 310 may digitally communicate with processor 302 through a serial port 306 that is coupled to system bus 312. Other interfaces, such as a game port, a universal serial bus (USB) or fire wire, may also provide digital communication between a peripheral device and processor 302. I/O circuitry 306 may also include latches, registers and direct memory access (DMA) controllers employed for interface with peripheral and other devices. Audio output 334 may comprise one or more speakers employed by a headphone or speaker system.

Display device 308 outputs video information—both unaltered and altered—including graphics components, backgrounds, graphics controls such as those described herein, graphics-based user interfaces, and other visual representations of data. For example, display device 308 may comprise a cathode ray tube (CRT), liquid crystal display (LCD), organic light emitting diode (OLED), or plasma display, of the types commercially available from a variety of manufacturers. Display device 308 may also comprise one or more optical modulation devices, or the like, used in projecting an image. Projection display devices that project an image onto a receiving surface are becoming more popular, less expensive, more compact; and may employ one or more optical modulation technologies as well as a wide variety of individual designs. Common optical modulation devices include those employing liquid crystal display (LCD) technology and digital mirror device (DMD) technology. When used as a display device for a computer, these projection devices provide the potential for a much larger image size and user interface.

Display device 308 may also digitally communicate with system bus 306 via a separate video interface, such as a video adapter 346. Video adapter 346 may be responsible for assisting processor 302 with video graphics processing including power conservation alterations described herein. Video adapter 346 may be a separate graphics card or graphics processor available from a variety of vendors that are well known in the art.

Input device 310 allows a user to enter commands and information into the computer system 300, and may comprise a keyboard, a mouse, a position-sensing pad on a laptop computer, a stylus working in cooperation with a position-sensing display on a PDA, or the like. Other input devices may include a remote control (for a projector), microphone, joystick, game pad, scanner, or the like. As used herein, input device refers to any mechanism or device for entering data and/or pointing to a particular location on an image of a computer display. Input as described herein may also come through intermediary devices. For example, a remote control may communicate directly with processor 302, or through an intermediary processor included in another device such as a hybrid entertainment device such as a set-top box or projector. The user may then input information to computer system 300 using an infrared remote control device that communicates first with the intermediary device, and then to processor 302.

In one embodiment, a graphics-based user interface implemented by computer system 300 displays a graphics control. To display a power conservation graphics control, processor 302 issues an appropriate command, followed by an identification of data that is to be used to construct the graphics control. Such data may include a number of power conservation control tools that allow a user to change how video data is altered and power is conserved. ROM 314 also stores a number power conservation commands and instructions for implementing the techniques described herein. In one embodiment, the present invention is practiced in the context of an application program that runs on an operating system implemented by computer system 300 or in combination with other program modules on computer system 300.

The present invention may be implemented on a range of computer systems. In addition to personal computers such as desktop computers and laptop computers, a variety of other computer systems and computer devices employing a digital processor, memory and a display device may implement the present invention. Handheld computers and other small portable digital devices such as cell phones and digital cameras are increasingly integrating video display and computer functionality. One current trend is hybrid entertainment devices that integrate the functionality of computer systems, audio devices, and televisions. Any of these devices may employ and benefit from the power conservation methods and systems described herein. The scope of digital computer systems is evolving and creating new devices that may employ the present invention. In general, any digital device employing an output display device that varies output power with video content may benefit from the present invention. Moreover, those skilled in the art will appreciate that the invention may be practiced with other computer system configurations, multiple display device systems, multi-processor systems, microprocessor-based or programmable consumer electronics, minicomputers, mainframe computers, and the like.

In some cases, control menus and toggles, a clock, and other small and frequently used graphics components may include video information that is not altered or altered less while video information for the background and all programs are altered to conserve power. Avoiding alteration maintains a person's ability to detect and use these elements.

The present invention is particularly useful to portable computing devices run with battery power. Most handheld devices are designed to rely on battery power. In addition, although the present invention has been discussed with respect to reduced power consumption, energy and power are relatively interchangeable in a discussion of the benefits of conservation.

Embodiments of the present invention further relate to computer readable media that include program instructions for performing power conservation techniques described herein. The media and program instructions may be those specially designed and constructed for the purposes of the present invention, or any kind well known and available to those having skill in the computer software arts. Examples of computer-readable media include, but are not limited to, magnetic media such as hard disks, semiconductor memory, optical media such as CD-ROM disks; magneto-optical media such as optical disks; and hardware devices that are specially configured to store program instructions, such as read-only memory devices (ROM), flash memory devices, EEPROMs, EPROMs, etc. and random access memory (RAM). Examples of program instructions include both machine code, such as produced by a compiler, and files containing higher-level code that may be executed by the computer using an interpreter.

Graphics controls and graphics-based user interfaces such as those described herein may be implemented using a number of computer languages and in a number of programming environments. One suitable language is Java, available from Sun Microsystems of Sunnyvale, Calif. Another suitable programming environment is the Microsoft Windows.®. pro-gramming environment, which provides a series of operating systems suitable for implementing the present invention both on laptop computers and handheld computers.

Although the foregoing invention has been described in some detail for purposes of clarity of understanding, those skilled in the art will recognize that various modifications may be made within the scope of the appended claims. The invention is, therefore, not limited to the specific features and embodiments described herein and claimed in any of its forms or modifications within the scope of the appended claims.

What is claimed is:

1. A method for reducing power consumed by an electronics device that includes a liquid crystal display device, the method comprising:
  identifying whether an inactive time reaches a predetermined threshold inactivity time to determine when alteration to video information begins;
  altering the video information at preset alteration intervals on the liquid crystal display device to produce altered video information while a backlight included in the liquid crystal display device provides light at a first backlight luminance level;
  changing the backlight to a second backlight luminance level;
  increasing transmissivity of the altered video information when the backlight changes to the second backlight luminance level; and
  determining a rate of the alteration of the video information by dividing a total alteration of the video information over a period of time by a number of intervals over the period of time,
  wherein an aggregate output luminance formed by combining the first backlight luminance level and the altered video information is equal to or less than a new aggregate output luminance formed by the second backlight luminance level and the video information that was altered to produce a new maximum luminance.

2. The method of claim 1 wherein the alteration includes a progression of multiple alterations and a final alteration in the progression produces the altered video information.

3. The method of claim 2 wherein each alteration in the progression produces a difference in video information that is not readily noticeable to a viewer.

4. The method of claim 1 wherein the electronics device is one of a desktop computer, laptop computer, a handheld computer, a portable phone or a portable music player.

5. The method of claim 1 further comprising:
  subsequently altering the video information to produce secondly altered video information while the backlight is at the second backlight luminance level;
  changing the backlight to a third backlight luminance level; and
  increasing transmissivity of the secondly altered video information when the backlight changes to the third backlight luminance level.

6. The method of claim 5 wherein a third aggregate output luminance formed by combining the second backlight luminance level and the secondly altered video information is equal to or less than a fourth aggregate output luminance formed by the third backlight luminance level and the video information that was altered to produce the secondly altered video information.

7. A system for reducing power consumed by an electronics device that includes a liquid crystal display device, the system comprising:

a monitoring apparatus designed or configured to monitor user activity in a display area for the liquid crystal display device; and a power conservation apparatus designed or configured to a) determine whether user activity information is received through the monitoring apparatus, b) identify whether an inactive time reaches a predetermined threshold inactivity time to determine when alteration to video information begins, c) alter the video information at preset alteration intervals on the liquid crystal display device to produce altered video information while a backlight included in the liquid crystal display device provides light at a first backlight luminance level, d) increase transmissivity of the altered video information when the backlight changes to a second backlight luminance level, and e) determine a rate of the alteration of the video information by dividing a total alteration of the video information over a period of time by a number of intervals over the period of time, wherein an aggregate output luminance formed by combining the first backlight luminance level and the altered video information is equal to or less than a new aggregate output luminance formed by the second backlight luminance level and the video information that was altered to produce a new maximum luminance.

8. The system of claim 7 wherein the power conservation apparatus comprises a power conservation control designed or configured to determine the alteration to the video information according to stored power conservation instructions, and to output a signal indicative of the alteration.

9. The system of claim 7 wherein the power conservation apparatus further comprises a video adaptor designed or configured to receive the signal produced by the power conservation control and to alter the video information based on the signal.

10. The system of claim 7 wherein the power conservation apparatus is further designed or configured to:
  d) subsequently alter the video information to produce secondly altered video information while the backlight is at the second backlight luminance level;
  e) change the backlight to a third backlight luminance level; and
  f) increase transmissivity of secondly altered video information when the backlight changes to the third backlight luminance level.

11. The system of claim 10 wherein a third aggregate output luminance formed by combining the second backlight luminance level and the secondly altered video information is equal to or less than a fourth aggregate output luminance formed by the third backlight luminance level and the video information that was altered to produce the secondly altered video information.

12. An electronics device comprising:
  a liquid crystal display device that includes a backlight offering multiple backlight luminance levels, wherein the liquid crystal display device changes power consumption with each backlight luminance level; and
  a power conservation apparatus designed or configured to a) identify whether an inactive time reaches a predetermined threshold inactivity time to determine when alteration to video information begins, b) alter video information at preset alteration intervals on the liquid crystal display device to produce altered video information while a backlight included in the liquid crystal display device provides light at a first backlight luminance level, c) increase transmissivity of the altered video information when the backlight changes to a second backlight luminance level, and d) determine a rate of the alteration of the video information by dividing a total alteration of the video information over a period of time by a number of intervals over the period of time,
  wherein an aggregate output luminance formed by combining the first backlight luminance level and the altered video information is equal to or less than a new aggregate output luminance formed by the second backlight luminance level and the video information that was altered to produce a new maximum luminance.

13. The electronics device of claim 12 wherein the electronics device is one of a desktop computer, laptop computer, a handheld computer, a portable phone or a portable music player.

14. The electronics device of claim 12 the difference between the aggregate output luminance and the new aggregate output luminance is not readily noticeable to a viewer.

15. The electronics device of claim 12 wherein the liquid crystal display device offers five or more backlight luminance levels.

16. The electronics device of claim 12 wherein the power conservation apparatus increases transmissivity of the altered video information to return to the video information that was present before alteration.

17. The electronics device of claim 12 wherein the power conservation apparatus is further designed or configured to:
  c) subsequently alter the video information to produce secondly altered video information while the backlight is at the second backlight luminance level;
  d) change the backlight to a third backlight luminance level; and
  e) increase transmissivity of altered video information when the backlight changes to the third backlight luminance level.

18. The electronics device of claim 17, wherein a third aggregate output luminance formed by combining the second backlight luminance level and the secondly altered video information is equal to or less than a fourth aggregate output luminance formed by the third backlight luminance level and the video information that was altered to produce the secondly altered video information.

* * * * *